US012360327B2

(12) United States Patent
Krampotich et al.

(10) Patent No.: US 12,360,327 B2
(45) Date of Patent: Jul. 15, 2025

(54) RACK MOUNTED ENCLOSURE

(71) Applicant: COMMSCOPE TECHNOLOGIES LLC, Hickory, NC (US)

(72) Inventors: Dennis Krampotich, Shakopee, MN (US); Paul M. Lawson, Minneapolis, MN (US); Jacob C. Anderson, Chanhassen, MN (US)

(73) Assignee: CommScope Technologies LLC, Claremont, NC (US)

( * ) Notice: Subject to any disclaimer, the term of this patent is extended or adjusted under 35 U.S.C. 154(b) by 83 days.

(21) Appl. No.: 17/769,466

(22) PCT Filed: Oct. 15, 2020

(86) PCT No.: PCT/US2020/055741
§ 371 (c)(1),
(2) Date: Apr. 15, 2022

(87) PCT Pub. No.: WO2021/076732
PCT Pub. Date: Apr. 22, 2021

(65) Prior Publication Data
US 2024/0126036 A1 Apr. 18, 2024

Related U.S. Application Data

(60) Provisional application No. 62/916,592, filed on Oct. 17, 2019, provisional application No. 63/023,706, filed on May 12, 2020.

(51) Int. Cl.
*G02B 6/00* (2006.01)
*G02B 6/44* (2006.01)

(52) U.S. Cl.
CPC ......... *G02B 6/4453* (2013.01); *G02B 6/4452* (2013.01); *G02B 6/4457* (2013.01)

(58) Field of Classification Search
CPC .. G02B 6/4453; G02B 6/4452; G02B 6/4457; G02B 6/00
See application file for complete search history.

(56) References Cited

U.S. PATENT DOCUMENTS 6,220,413 B1   4/2001  Walters et al.
6,933,441 B2 * 8/2005  Fuller .................... H02G 11/02
                                                              174/64

(Continued)

FOREIGN PATENT DOCUMENTS

KR   10-2004-0102376 A   12/2004
WO      2011/011510 A2    1/2011

(Continued)

OTHER PUBLICATIONS

International Search Report and Written Opinion of the International Searching Authority for International Patent Application No. PCT/US2020/055741mailed Feb. 10, 2021, 10 pages.

*Primary Examiner* — Jennifer Doan
(74) *Attorney, Agent, or Firm* — Merchant & Gould P.C.

(57) ABSTRACT

The present disclosure relates to a telecommunication device including an enclosure configured to be mounted to a telecommunication rack. The device also includes a tray that mounts within the enclosure, the tray being slidably movable relative to the enclosure along a front-to-rear axis between a first position and a second position. The tray is fully within the enclosure when in the first position. A forward portion of the tray projects forwardly from the front end of the enclosure and a rearward portion of the tray is within the enclosure when the tray is in the second position. A spool mounts on the tray and is moveable with the tray as the tray is moved between the first and second positions. The spool being rotatable relative to the tray and the enclosure to (Continued)

allow cable to be paid out from the spool at least when the tray is in the second position.

41 Claims, 21 Drawing Sheets

(56) References Cited

U.S. PATENT DOCUMENTS

| | | |
|---|---|---|
| 8,442,847 B1 | 4/2013 | Kowalczyk et al. |
| 8,565,572 B2 | 10/2013 | Krampotich et al. |
| 8,737,796 B2 | 5/2014 | Krampotich et al. |
| 9,606,319 B2 | 3/2017 | Kowalczyk et al. |
| 10,514,518 B1* | 12/2019 | Livingston ............ G02B 6/4452 |
| 2011/0044599 A1 | 2/2011 | Kowalczyk et al. |
| 2011/0280536 A1 | 11/2011 | de los Santos Campos et al. |
| 2011/0317974 A1 | 12/2011 | Krampotich et al. |
| 2014/0248028 A1 | 9/2014 | Campbell et al. |
| 2016/0147030 A1* | 5/2016 | Kowalczyk ............ G02B 6/4446 |
| | | 385/135 |

FOREIGN PATENT DOCUMENTS

| | | |
|---|---|---|
| WO | 2011/163464 A2 | 12/2011 |
| WO | 2015/164738 A1 | 10/2015 |

* cited by examiner

RACK MOUNTED ENCLOSURE

CROSS-REFERENCE TO RELATED APPLICATIONS

This application is a National Stage Application of PCT/US2020/055741, filed on Oct. 15, 2020, which claims the benefit of U.S. Patent Application Ser. No. 62/916,592, filed on Oct. 17, 2019, and claims the benefit of U.S. Patent Application Ser. No. 63/023,706, filed on May 12, 2020, the disclosures of which are incorporated herein by reference in their entireties. To the extent appropriate, a claim of priority is made to each of the above disclosed applications.

TECHNICAL FIELD

The present disclosure relates generally to telecommunication devices. More particularly, the present disclosure relates to telecommunication devices such as enclosures adapted to be mounted on telecommunication racks.

BACKGROUND

In the telecommunication industry, use of fiber optic cables for carrying transmission signals is prevalent. Fiber distribution racks (i.e., frames) are adapted to aid in the connection and organization of fiber optic equipment. To connect fiber optic equipment in a fiber distribution rack or to connect fiber optic equipment between fiber distribution racks, fiber optic cables are routed between the fiber optic equipment and/or the fiber distribution racks. However, the length of fiber optic cable needed between the fiber optic equipment and/or the fiber distribution racks varies depending upon the location of the equipment within the fiber distribution racks or the locations of the fiber distribution racks. U.S. Pat. Nos. 8,422,847; 8,565,572; and 8,737,796 disclose systems for managing the lengths of fiber optic cables in the distribution rack environment.

SUMMARY

One aspect of the present disclosure relates to a telecommunication device including an enclosure configured to be mounted to a telecommunication rack. The enclosure includes a front end, a rear end, a major top side, a major bottom side, a minor left side and a minor right side. The enclosure also includes a main housing body including a bottom wall defining the major bottom side of the enclosure, left and right side walls respectively defining the left and right sides of the enclosure, and a rear wall defining the rear end of the enclosure. The enclosure also includes a top cover that defines the major top side of the enclosure. The top cover is mountable to the main housing body to define the major top side of the enclosure and is removable from the main housing body to open the major top side of the enclosure. The telecommunication device also includes a tray that mounts within the enclosure. The tray is slidably removable relative to the enclosure along a front-to-rear axis between a first position and a second position. The tray is fully within the enclosure when in the first position. A forward portion of the tray projects forwardly from the front end of the enclosure and a rearward portion of the tray is within the enclosure when the tray is in the second position. The telecommunication device also includes a spool that mounts on the tray. The spool is rotatable relative to the tray and the enclosure when the tray is in the second position. The spool interfaces with a stop coupled to the enclosure to prevent rotation of the spool relative to the enclosure and the tray when the tray is in the first position. The interface between the spool and the stop is automatically disengaged as the tray is moved from the first position to the second position.

Another aspect of the present disclosure relates to a telecommunication device including an enclosure configured to be mounted to a telecommunication rack. The enclosure includes a front end, a rear end, a major top side, a major bottom side, a minor left side, and a minor right side. A tray mounts within the enclosure. The tray is slidably movable relative to the enclosure along a front-to-rear axis between a first position and a second position. The tray is fully within the enclosure when in the first position. A forward portion of the tray projects forwardly from the front end of the enclosure and a rearward portion of the tray is within the enclosure when the tray is in the second position. The telecommunication device also includes a spool that mounts on the tray. The spool is movable with the tray as the tray is moved between the first and second positions. The spool is rotatable relative to the tray and the enclosure to allow cable to be paid out from the spool at least when the tray is in the second position. The telecommunication device also includes a latch for latching the tray in the first and second positions.

A variety of additional aspects will be set forth in the description that follows. The aspects can relate to individual features and to combinations of features. It is to be understood that both the foregoing general description and the following detailed description are exemplary and explanatory only and are not restrictive of the broad concepts upon which the examples disclosed herein are based.

DETAILED DESCRIPTION

Figure 1:
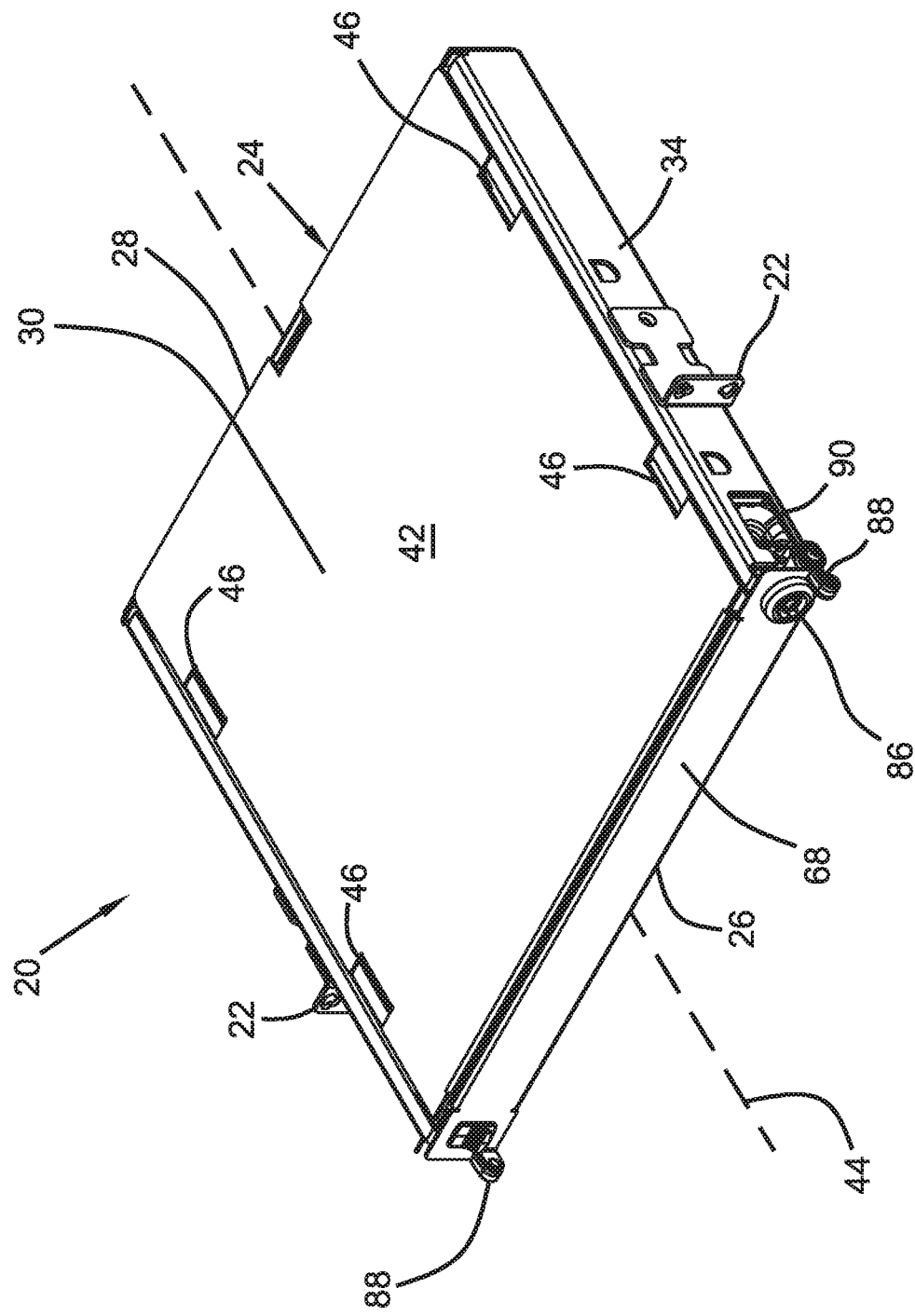
FIG. 1 is a front, top, left side perspective view of a telecommunication device in accordance with the principles of the present disclosure.
Figure 2:
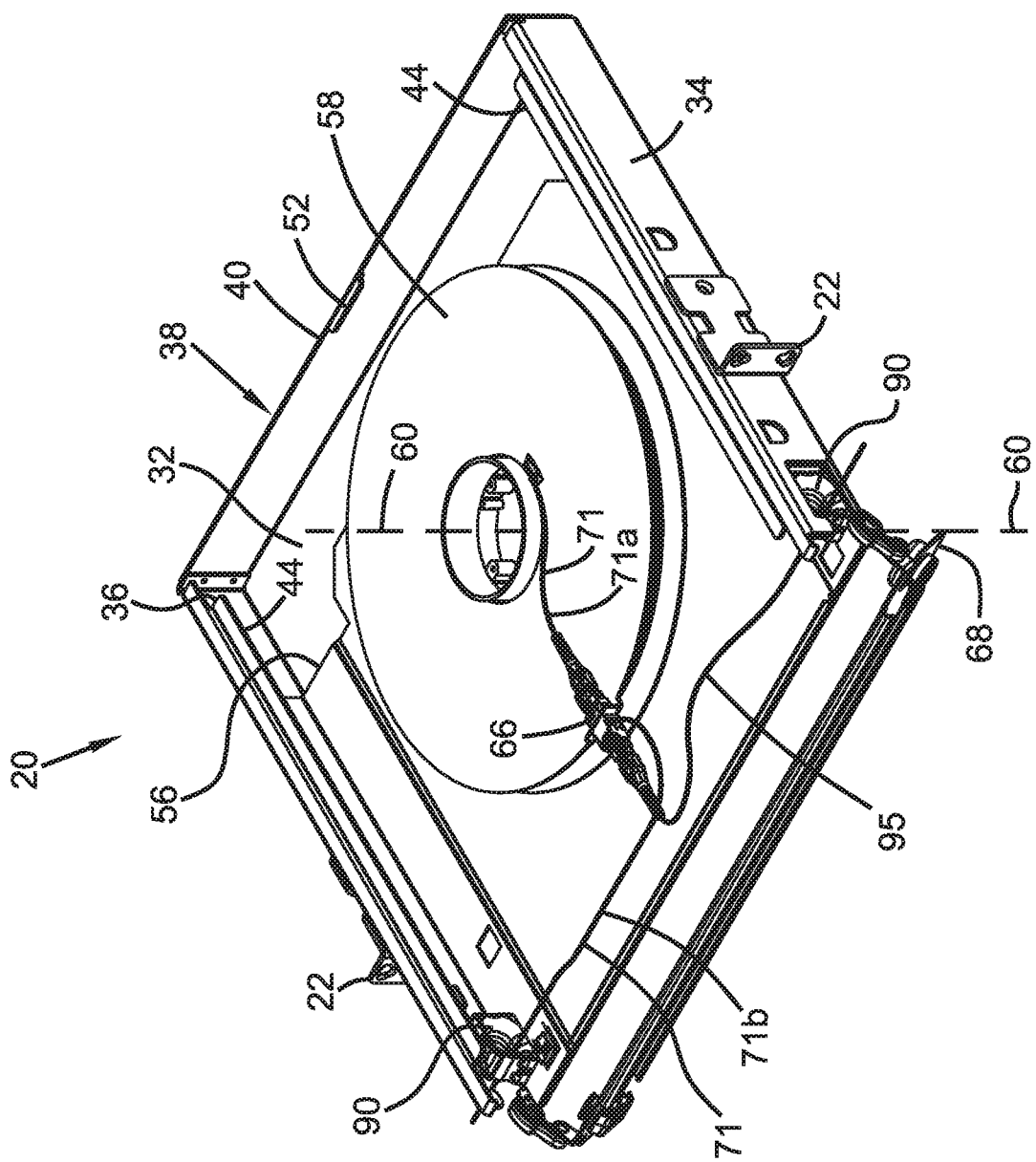
FIG. 2 is a perspective view of the telecommunication device of FIG. 1 with the top cover removed and with the front panel moved to an open position.

FIGS. 1 and 2 depict a telecommunication device 20 in accordance with the principles of the present disclosure. The telecommunication device 20 is adapted to be mounted within a conventional telecommunication rack (i.e., frame). A typical telecommunication rack includes vertical rails (e.g., posts) each defining fastener openings. The telecommunication device 20 includes rack mounting brackets 22 for securing the telecommunication device 20 to a conventional telecommunication rack. Typically, the telecommunication device 20 mounts between the rails of the rack with fastener openings 24 of the rack mounting brackets 22 aligning with corresponding fastener openings defined by the vertical rails of the rack. Fasteners are installed through the aligned fastener openings to secure the brackets 22 and thus the telecommunication device 20 to the rack. Conventionally, the separate rails of a given telecommunication rack define a standard width distance such as 19 inches, or 23 inches.

When the telecommunication device 20 is secured to the rack, the telecommunication device 20 is preferably oriented in a horizontal orientation. The telecommunication device 20 of FIG. 1 is depicted as a single rack unit (e.g., 1 RU) device. A rack unit is a space on the rack having a predetermined height (e.g., 1.75 inches). By single rack unit device, it is meant that the telecommunication device 20 occupies no more than one rack unit of a given rack when mounted to the rack. Of course, aspects of the present disclosure are also applicable to telecommunication devices having larger heights such as two rack unit devices, three rack unit devices and the like.

Referring still to FIGS. 1 and 2, the telecommunication device 20 includes an enclosure 24 adapted to be mounted to a telecommunication rack by the rack mounting brackets 22. The enclosure 24 includes a front end 26, a rear end 28, a major top side 30, a major bottom side 32, a minor left side 34 and a minor right side 36. When the telecommunication device 20 is mounted to a rack, the major top and bottom sides 30, 32 are horizontally oriented with the major top side 30 being above the major bottom side 32.

The enclosure 24 of the telecommunication device 20 includes a main housing body 38 including a bottom wall defining the major bottom side 32 of the enclosure 24, left and right walls respectively defining the left and right minor sides 34, 36 of the enclosure 24, and a rear wall 40 defining the rear end 28 of the enclosure 24. The enclosure also includes a top cover 42 that defines the major top side 30 of the enclosure 24. The top cover 42 is mountable to the main housing body 38 to define the major top side 30 of the enclosure 24. The top cover 42 is removable (as shown at FIG. 2) from the main housing body 38 to open the major top side 30 of the enclosure 24.

In certain examples, the top cover 42 can be mounted on and removed from the main housing body 38 without the use of a tool. In certain examples, the top cover 42 is coupled to the main housing body 38 by a slidable interface. In certain examples, the top cover 42 can be mounted to the main housing body 38 by sliding the top cover 42 in a rearward direction along a front-to-rear axis 44, and can be removed from the main housing body 38 by sliding the top cover 42 in a forward direction relative to the main housing body 38 along the front-to-rear axis 44. In certain examples, the slidable interface can include rails or guides defined by one of the main housing body 38 and the top cover 42 that fit within corresponding receivers defined by the other of the main housing body 38 and the top cover 42. As depicted, the main housing body 38 includes oppositely positioned guides 44 that extend along the front-to-rear axis 44, and the top cover 42 defines receivers 46 that slidably receive the guides 44. In the depicted examples, the receivers 46 are defined between a main body of the top cover 42 and lower tabs or lips 48 integrated with the top cover 42. The top cover 42 also a rear tab 50 that fits beneath a tab 52 provided at the rear end of the enclosure.

The telecommunication device 20 also includes a tray 56 that mounts within the enclosure 24. The tray 56 is slidably movable relative to the enclosure 24 along the front-to-rear axis 44 between a first position (e.g., a fully enclosed position, see FIGS. 2, 4, 5 and 12) and a second position (e.g., a partially enclosed position, see FIGS. 6, 7, 8 and 9). The tray 56 is fully within the enclosure 24 when in the first position. In contrast, when the tray 56 is in the second position, a forward portion 57 of the tray 56 projects forwardly from the front end 26 of the enclosure 24 and a rearward portion 59 is within the enclosure 24.

Figure 12:
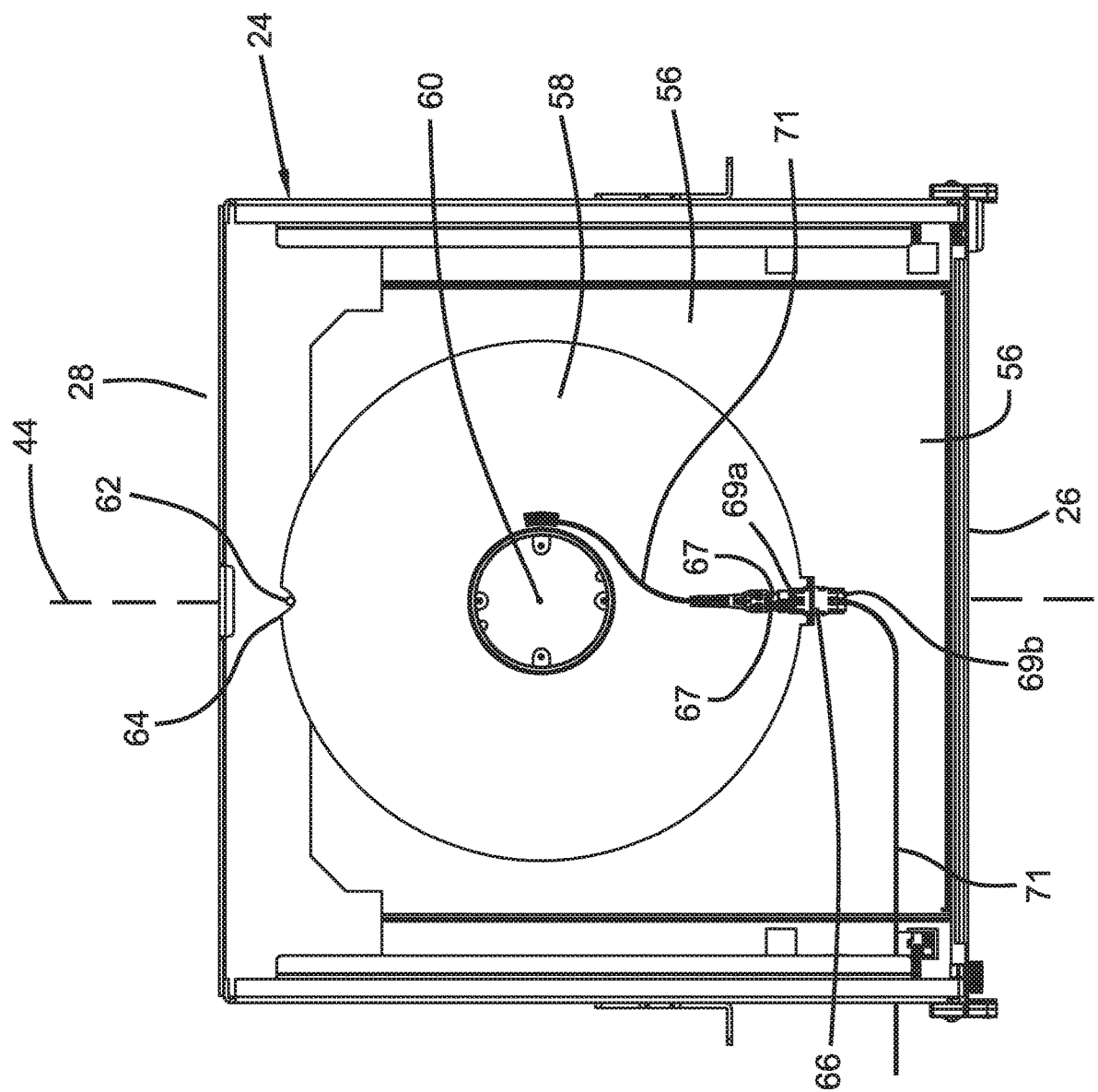
FIG. 12 depicts a spool locking configuration for preventing rotation of the spool when the tray of the telecommunication device of FIG. 1 is fully within the enclosure of the telecommunication device of FIG. 1.
Figure 13:
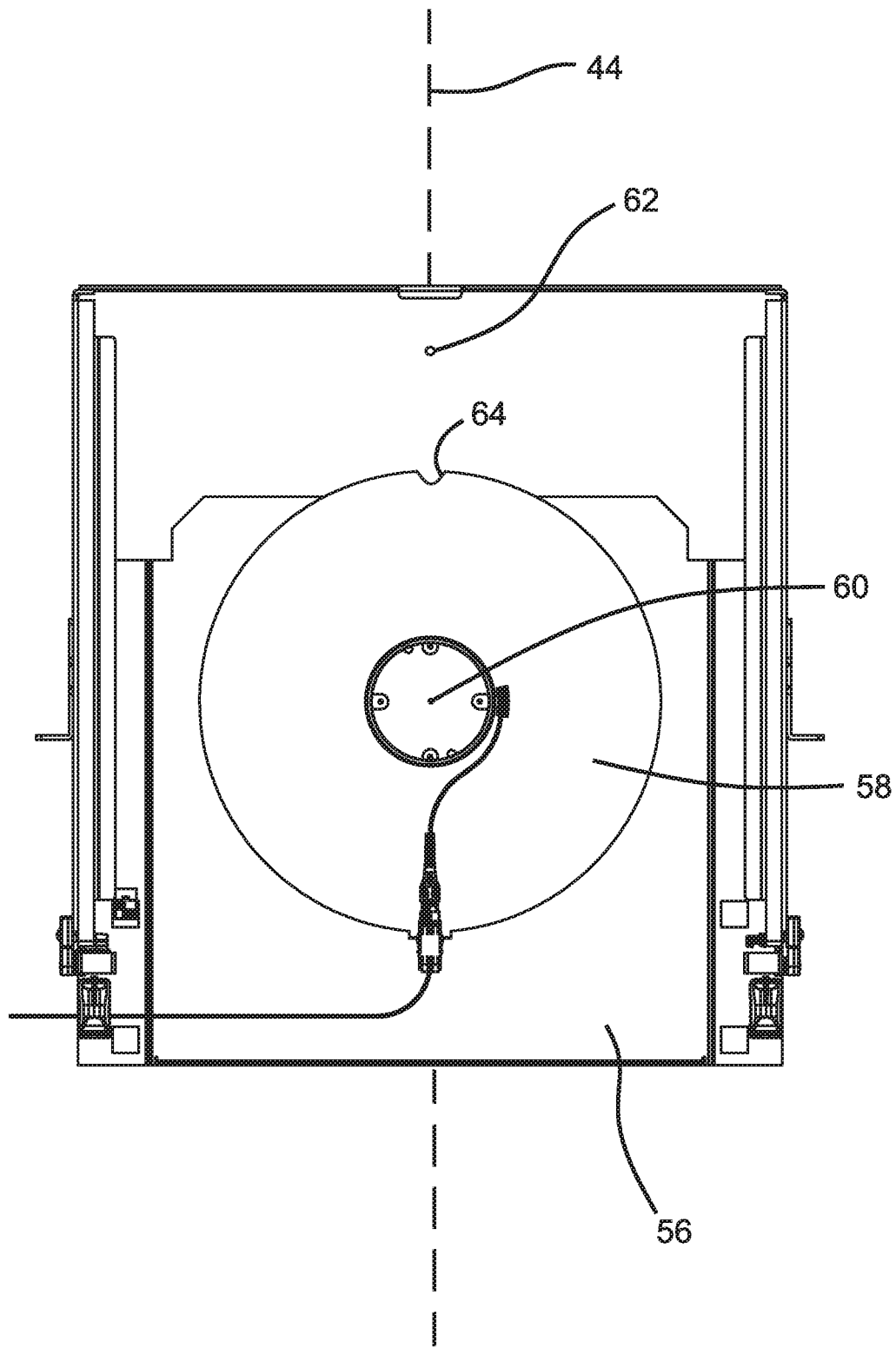
FIG. 13 shows the tray of FIG. 12 in a cable payout position in which the spool locking configuration is disengaged.
Figure 14:
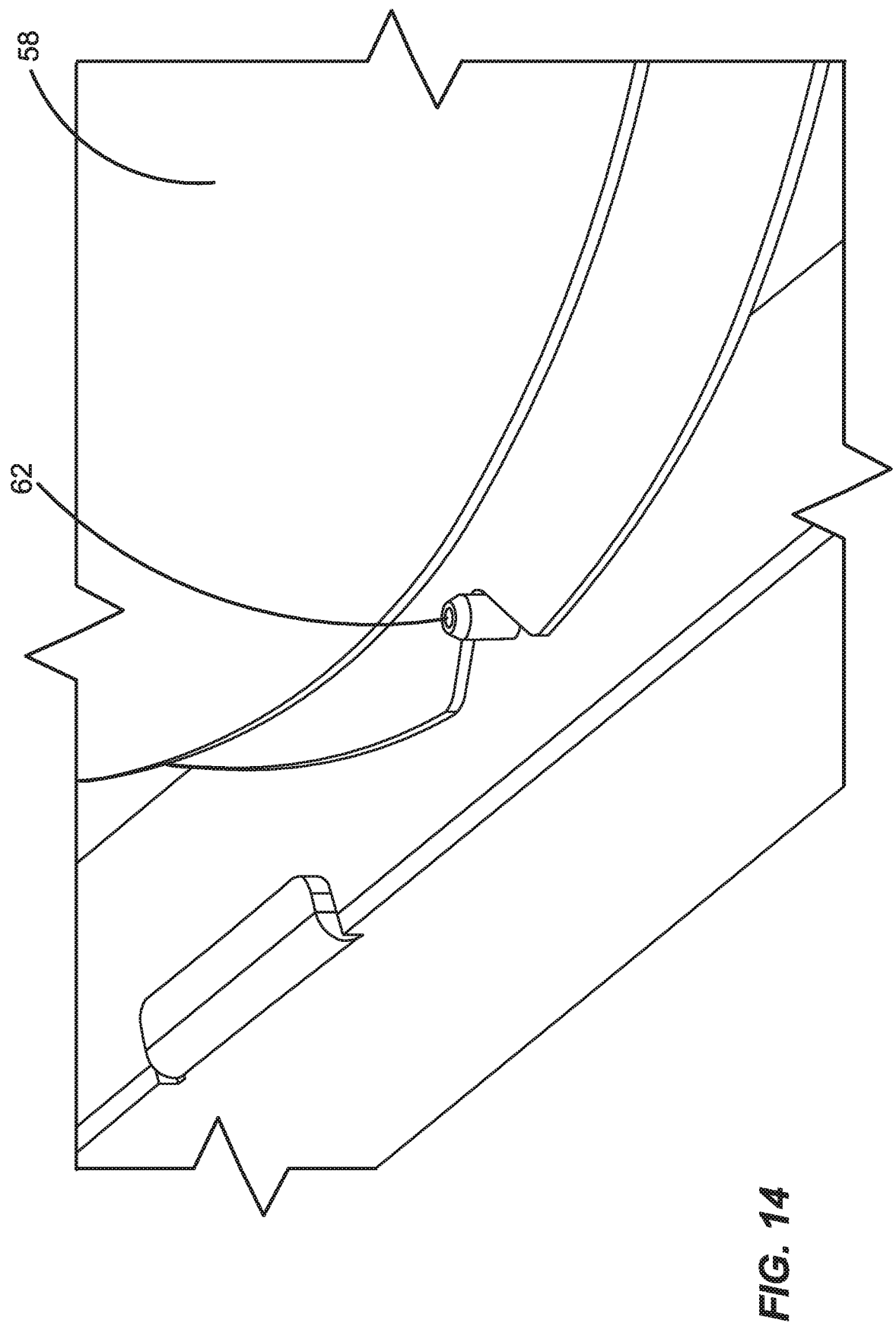
FIG. 14 shows the spool of FIG. 12 engaging a stop member of the locking configuration of FIG. 12 when the tray is in the fully enclosed position.
Figure 15:
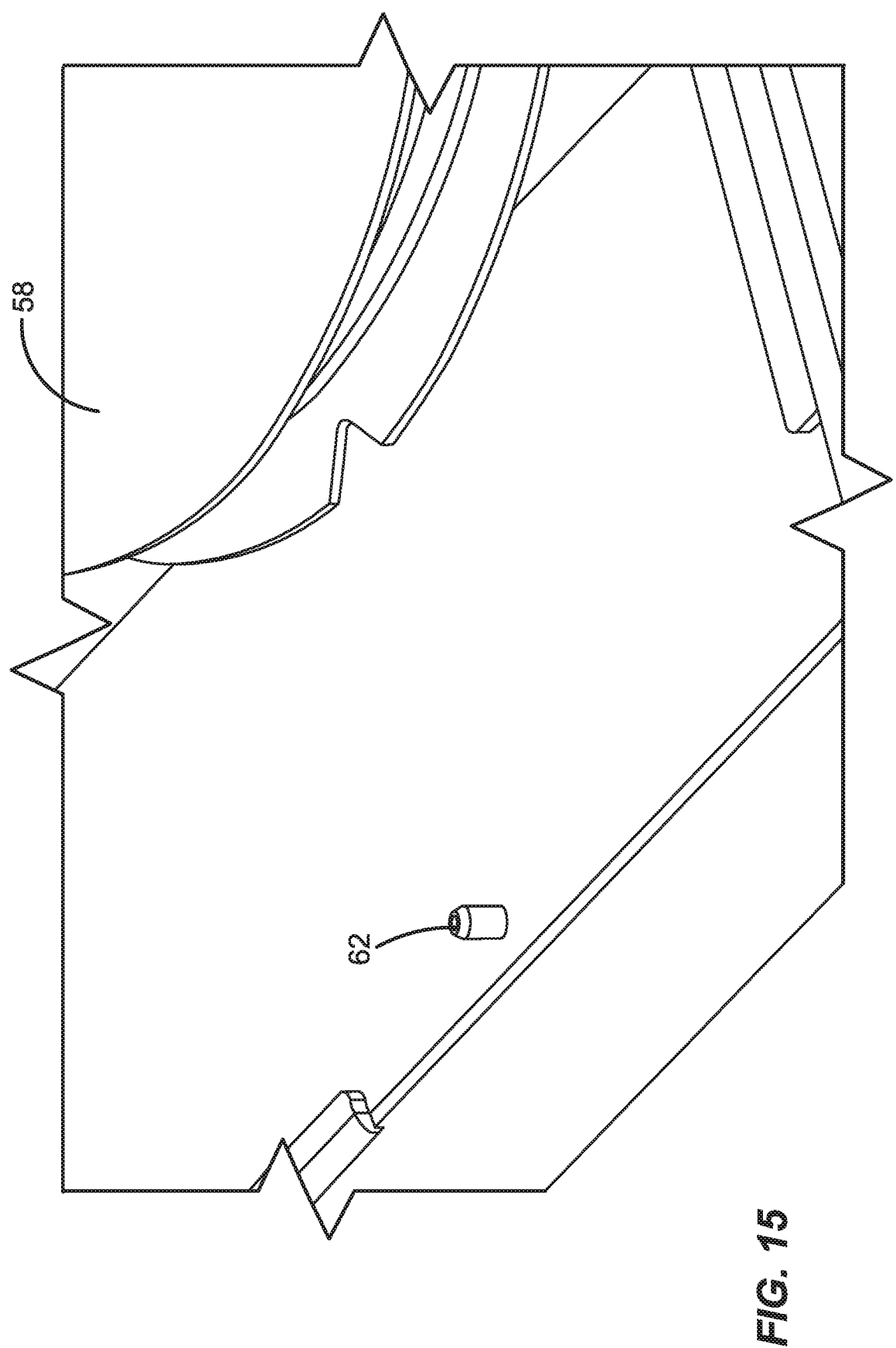
FIG. 15 shows the spool of FIG. 14 disengaged from the stop when the tray is in the cable payout positon (e.g., a partially enclosed position)

The telecommunication device 20 further includes a spool 58 that mounts on the tray 56. The spool 58 is rotatable relative to the tray and the enclosure 24 about an axis of rotation 60 at least when the tray 56 is in the second position. In the depicted example, the axis of rotation 60 is vertically oriented and is generally perpendicular relative to the major top and bottom sides 30, 32 of the enclosure 24. The spool 58 interfaces with a stop 62 coupled to the enclosure 24 to prevent rotation of the spool 58 relative to the enclosure 24 and the tray 56 when the tray 56 is in the first position. The anti-rotation interface between the spool 58 and the stop 62 is automatically disengaged as the tray 56 is moved from the first position to the second position. FIGS. 12 and 14 show the tray 56 in the first position (e.g., the fully enclosed position) where the stop 62 interferes with rotation of the spool 58. FIGS. 13 and 15 show the tray in the second position (e.g., the partially enclosed position and also the cable payout position) in which the stop 62 is offset and therefore disengaged from the spool 58 such that the stop 62 does not prevent rotation of the spool 58 about the axis of rotation 60.

It will be appreciated that a fiber optic cable is coiled on the spool 58. The fiber optic cable can be paid out from the spool 58 through the front of the telecommunication device 20 when the tray 56 is in the second position. The fiber optic cable is prevented from being paid out from the spool 58 through the front of the telecommunication device 20 when the tray is in the first position. In certain examples, the spool 58 includes a notch 64 at an outer circumference of the spool 58 that is adapted to receive the stop 62 when the tray 56 is moved to the first position. In certain examples, the stop 62 can be a projection that projects upwardly from the major bottom side 32 of the enclosure 24. The projection can be formed by a fastener, a tab or other structure that projects upwardly from the major bottom side 32. In certain examples, the projection can be a fastener such as a bolt that projects upwardly from the major bottom surface, or can be a feature press fit into the major bottom side such as a press in nut, stud, or other feature. In certain examples, a desired rotational locking position coincides with the notch 64 being located at the rear of the tray 56 and a fiber optic adapter 66 carried by the spool 58 being located adjacent a front of the tray 56. In certain examples, the notch 64 and the fiber optic adapter 66 are both located adjacent the outer circumference of the spool 58 but are located on diametrically opposite sides of the axis of rotation 60.

In certain examples, the top cover 42 can be mounted and removed from the main housing body 38 without the use of a tool. In the depicted example, the top cover 42 is required to be slid fully out the front end 26 of the enclosure 24 to remove the top cover 42 from the main housing body 38, and is required to be slid fully from the front end 26 to the rear end 28 to mount the top cover 42 to the enclosure 24. It will be appreciated that the enclosure 24 also includes a front cover 68 mounted at the front end 26 of the enclosure 24. The front cover 68 is movable between an open position and a closed position. When the front cover 68 is in the closed position and the top cover 42 is installed on the main housing body 38, the front cover 68 opposes a front edge of the top cover 42 to prevent the top cover 42 from being removed from the main housing body 38. When the front cover 68 is open, the top cover 42 can be slid forwardly from the main housing body 38 to remove the front cover 42 from the main housing body 38. However, in certain examples, the tray 56 can include a feature that prevents removal of the top cover 42 from the main housing body 38 while the tray 56 is in the first position. For example, the tray 56 can include a stop 70 that opposes at least one of the tabs 48 when the tray 56 is in the first position to prevent the top cover 42 from being slid forwardly relative to the main housing body 38. When the front cover 68 is open and the tray 56 is moved to the second position, the top cover 42 can be slid forwardly relative to the main housing body 38 until the tab 48 engages the stop 70. At this point, the top cover 42 can be flexed slightly upwardly to allow the tab 48 to move over the stop 70 and allow the top cover 42 to be fully slid from the main housing body 38. In other examples, cut outs or notches can be provided in the guides 44 at locations that align with the tabs 48 when the tray 56 is in the second position. In this example, the top cover 42 can be lifted from the main housing body 38 once the top cover 42 has been moved forwardly to the position where the tabs 48 register with the cut outs in the receivers 46. Thus, in this example, it is not necessary to fully slide the top cover 42 in and out of the main housing body 38. Instead, to load the top cover 42 into the main housing body 38, the tray 56 can be moved to the second position and the top cover 42 can be dropped down into a pre-installed position, and once in the pre-installed position can be slid rearwardly to a fully installed position. Similarly, the top cover 42 can be removed from the main housing body 38 by moving the tray 56 to the second position, and then sliding the top cover 42 to the pre-installed position where the top cover 42 can be lifted from the main housing 38.

Figure 10:
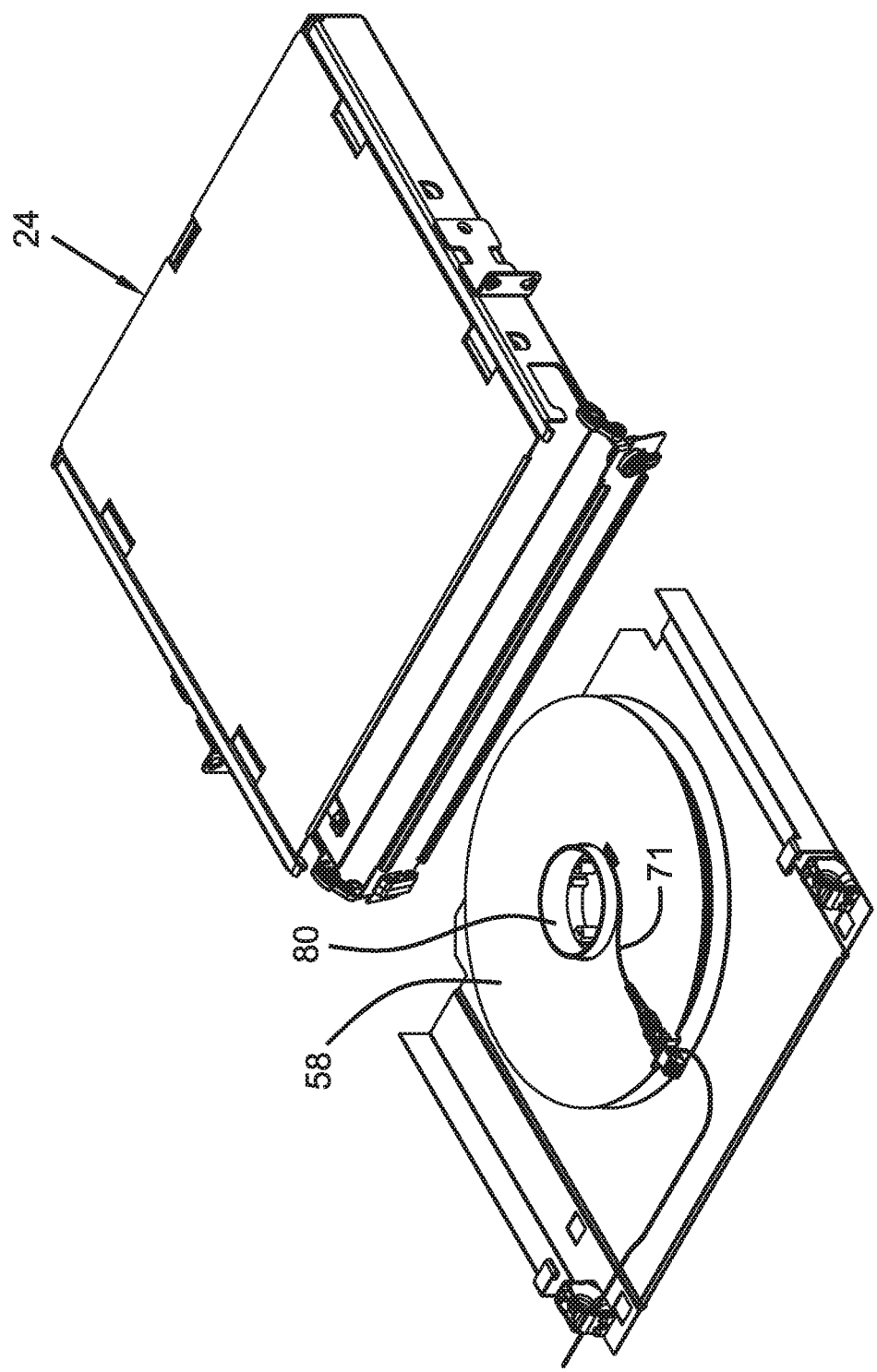
FIG. 10 depicts the telecommunication device of FIG. 1 with the inner tray fully removed from the enclosure of the telecommunication device.
Figure 11:
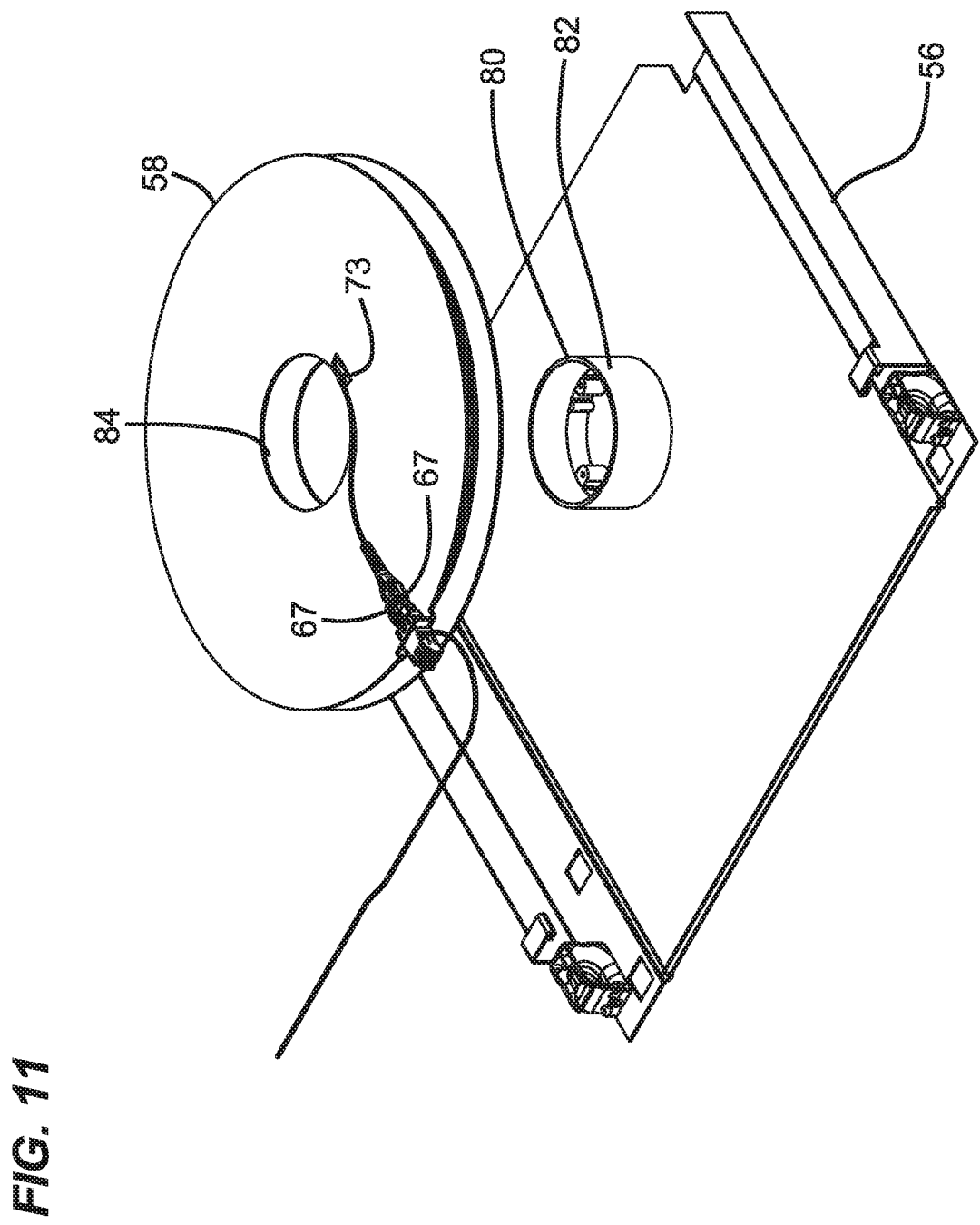
FIG. 11 depicts the tray of FIG. 10 with a cable spool removed from the tray.

Referring to FIGS. 2, 10 and 11, the telecommunication device 20 further includes a spool support core 80 carried with the tray 56 such that the spool support core 80 moves with the tray 56 as the tray 56 is slid between the first and second positions. In certain examples, the spool support core 80 is fixed relative to the tray 56 and is configured not to rotate relative to the tray 56. The spool support core 80 defines an outer circumference which defines a bearing surface 82. The spool 58 rotatably mounts on the spool support core 80 and is configured to rotate relative to the spool support core 80 about the axis of rotation 60 at least when the spool 58 is not locked. The spool 58 defines an inner bearing surface 84 at an inner diameter of the spool 58. The inner bearing surface 84 faces radially toward the axis of rotation 60 while the bearing surface 82 of the spool support core 80 faces radially outwardly from the axis of rotation 60. The inner bearing surface 84 opposes the bearing surface 82.

In certain examples, the spool 58 can be removed from the tray 56 by lifting the spool 58 off the spool support core 80 as shown at FIG. 11. It will be appreciated that this allows the spool 58 to be readily replaced, or to be readily installed and/or removed in the field. In certain examples, the tray 56 can be fully removed from the enclosure 24 to facilitate mounting a spool on the spool support core 80, removing a spool from the spool support core 80, or replacing one spool on the spool support core 80 with another spool. Alternatively, the top cover 42 can be removed from the enclosure 24 as shown at FIG. 2 to provide access to the spool support core 80 for installing, removing or replacing a spool from the tray 56.

As indicated above, the fiber optic adapter 66 is mounted to the spool 58. Preferably, the fiber optic adapter 66 is carried with the spool 58 as the spool is rotated about the axis of rotation 60 relative to the tray 56 and the enclosure 24. Thus, the fiber optic adapter 66 is adapted to rotate in unison with the spool 58 about the axis of rotation 60 as fiber optic cable is paid out from the spool 58. In the depicted example, the fiber optic adapter 66 can be a duplex fiber optic adapter adapted for receiving two fiber optic connectors 67 that terminate a duplex fiber optic cable coiled about the spool 58. In other examples, the fiber optic adapter 66 can be adapted for receiving a single fiber optic connector. In certain examples, the fiber optic adapter 66 can be configured for receiving single fiber optical connectors such as SC connectors or LC connectors. In other examples, the fiber optic adapter 66 can be configured for receiving a multi-fiber optical connector such as an MPO fiber optic connector.

It will be appreciated that the fiber optic adapter 66 is adapted for coupling together two fiber optic connectors such that the fiber optic connectors are coaxially aligned with one another thereby allowing an optical signal to be transmitted between optical fibers supported by the aligned fiber optic connectors. In certain examples, the fiber optic adapter 66 includes at least a first port 69*a* that faces generally toward the axis of rotation 60 and at least a second port 69*b* that faces generally away from the axis rotation 60.

In certain examples, the second port is adapted to face in a forward direction when the tray 56 is in the first position. As indicated previously, the fiber optic adapter 66 is preferably on a diametrically opposite of the axis of rotation 60 from the rotational locking notch 64.

In certain examples, the fiber optic cable 71 coiled on the spool 58 has an inner end portion 71a closest to the inner diameter of the spool 58 and an outer end portion 71b closest to the outer diameter of the spool 58. In certain examples, inner end portion of the cable can pass through an opening 73 through the upper flange of the spool 58. The inner end portion of the fiber optic cable can be connectorized by a fiber optic connector 67 that plugs into one of the ports of the fiber optic adapter 66. The fiber optic connector 67 can remain plugged into the fiber optic adapter 66 as cable is paid out from the spool 58 and the spool 58 rotates about the axis of rotation 60. The fiber optic cable 71 is adapted to be paid out from the spool 58 starting from the outer end portion 71b of the cable and working toward the inner end portion 71a of the cable. The spool 58 rotates relative to the tray 56 and the enclosure 24 as the cable 71 is paid out from the spool 58. The fiber optic adapter 66 and the fiber optic connector 67 inserted therein rotate in concert with the spool 58 as the cable is paid out from the spool 58.

As indicated previously, the enclosure 24 includes the front cover 68 that can be used to selectively cover and open the front end 26 of the enclosure 24. The front cover 68 mounts at the front end 26 of the enclosure 24 and is adapted to be moved between an open position and a closed position. A lock 86 is provided on the front cover for locking the front cover 68 in the closed position. The front cover also includes a separate latch for retaining the front cover in the closed position. The lock 86 provides enhanced security as compared to the latch, and preferably requires a key (e.g., a wrench key) to be locked and unlocked. The front cover 68 is connected to the enclosure 24 by a pivot link 88 having one end pivotally connected to the front end 26 of the enclosure 24 and a second end pivotally connected to the front cover 68. As depicted, a pair of the pivot links 88 are used to couple the front cover 68 to the main housing body 38. The pivot links 88 are positioned at opposite left and right ends of the front cover 68.

In the depicted example, the telecommunication device 20 further includes bend radius limiters 90 or other type of cable management structures mounted at the left and right sides of the tray 56 at the forward portion 57 of the tray 56. In the depicted example, bend radius limiters 90 are shown as cable receiving rings adapted for routing fiber optic cables leftwardly and rightwardly from the enclosure 24. In one example, a pivotal fiber retainer 93 can be spring biased to a closed position and can be flexed to an open position to allow fiber optic cables to be inserted into the cable receiving rings. Once the fiber optic cables have been inserted into the cable receiving rings, the fiber retainers 93 are spring biased back to the closed position to maintain the cables within the cable receiving rings. It will be appreciated that the term cable receiving ring includes full rings and partial rings.

In certain examples, the telecommunications device can include a latching arrangement such as a spring bias latch arrangement for latching the tray 56 in the first and second positions. In one example, the latching arrangement includes a spring loaded button latch 92 at the major bottom side 32 of the enclosure 24. The button latch 92 is adapted to fit within corresponding openings 94a, 94b defined by the tray 56. It will be appreciated that the opening 94a corresponds to the first tray position and the opening 94b corresponds to the second tray position. When the tray is moved to the first position, the button latch snaps within the opening 94a. To move the tray from the first position to the second position, the operator depresses the button thereby allowing the tray to move to the second position. When the tray reaches the second position, the button 92 snaps within the opening 94b. To fully remove the tray 56 from the enclosure 24 or to move the tray 56 from the second position back to the first position, the button 92 is again depressed thereby allowing for movement of the tray away from the second position.

Figure 3:
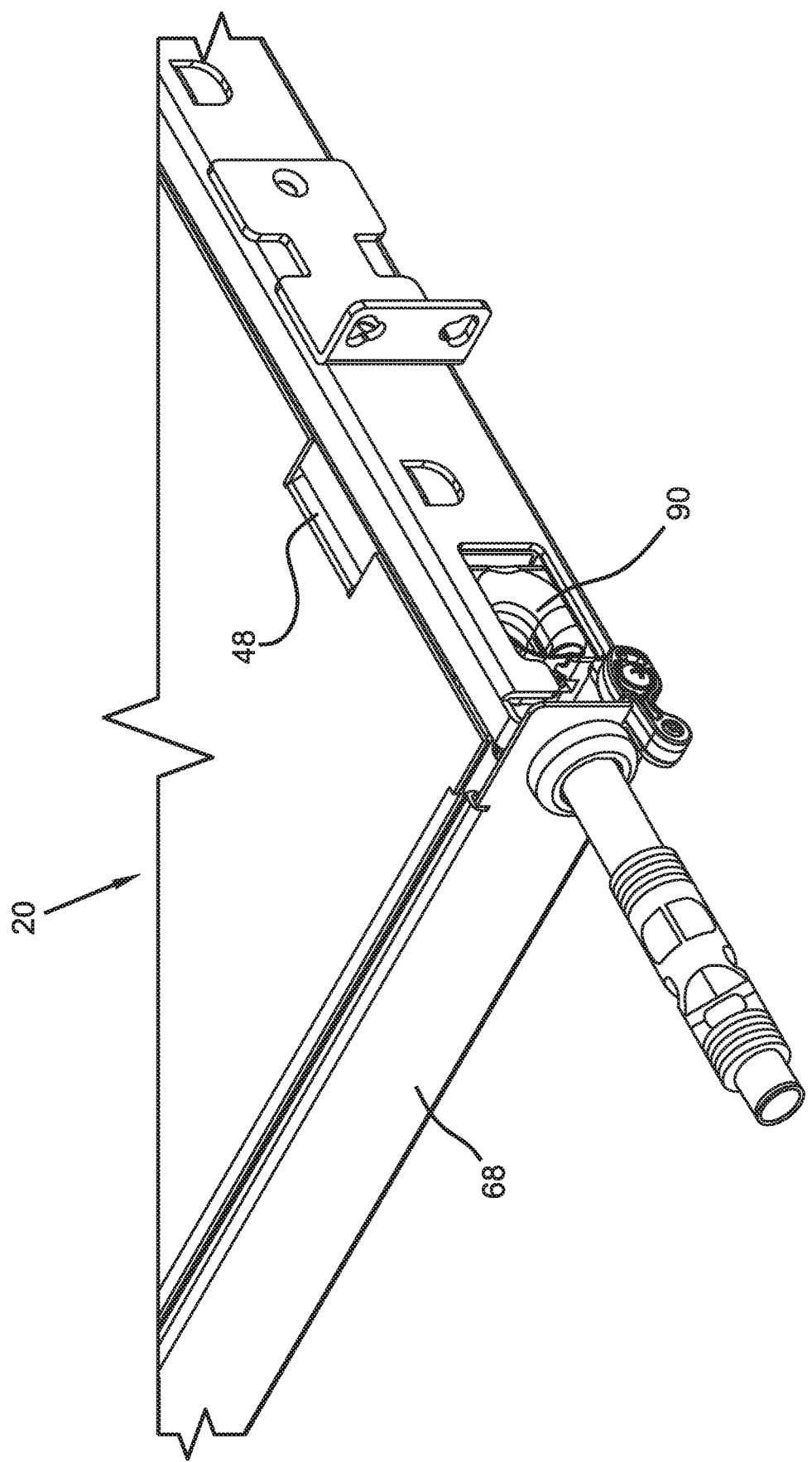
FIG. 3 depicts a portion of FIG. 1 with a key being used to unlock a lock provided on the front cover of the telecommunication device.
Figure 4:
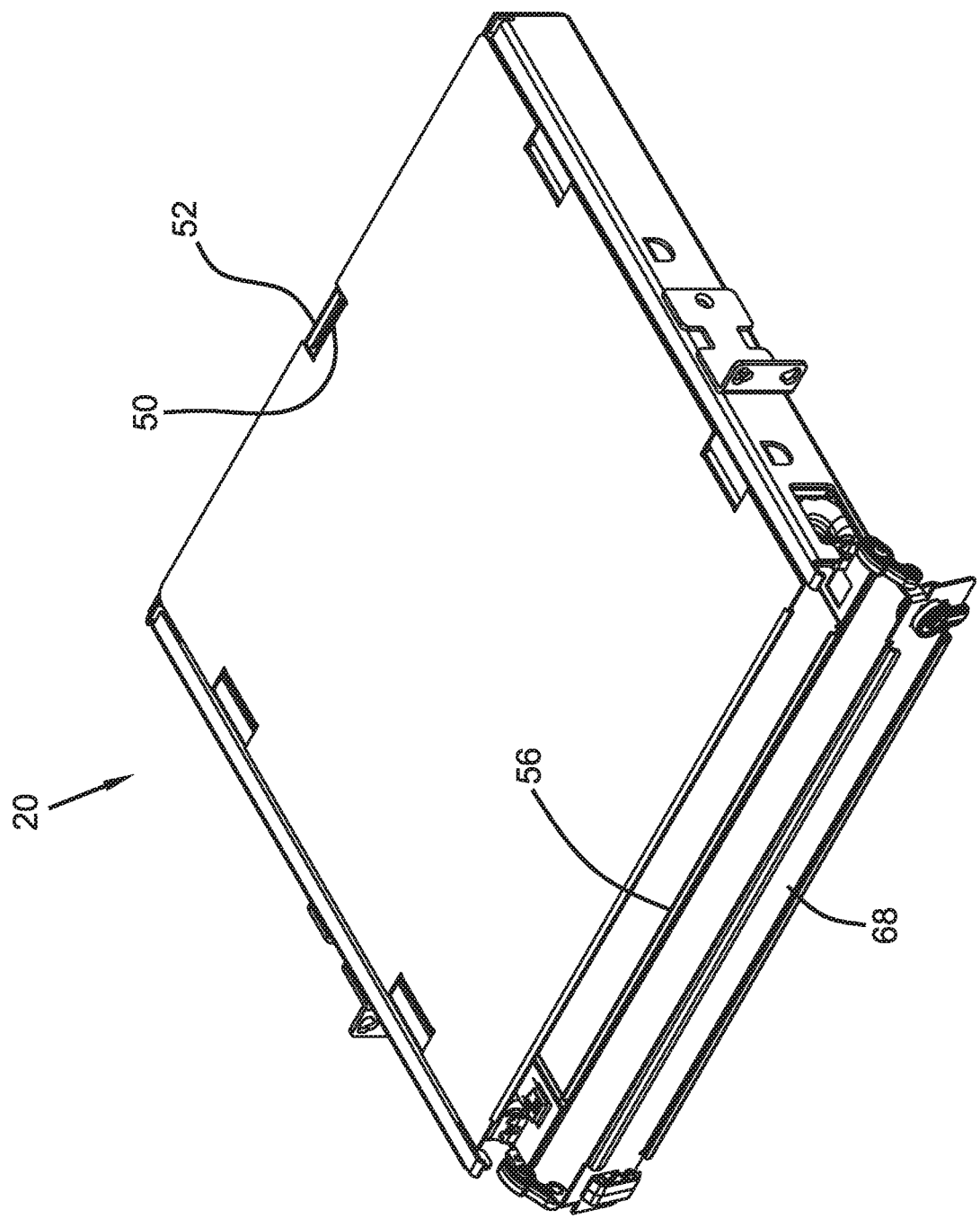
FIG. 4 is a perspective view of the telecommunication device of FIG. 1 with the front door in an open position.
Figure 5:
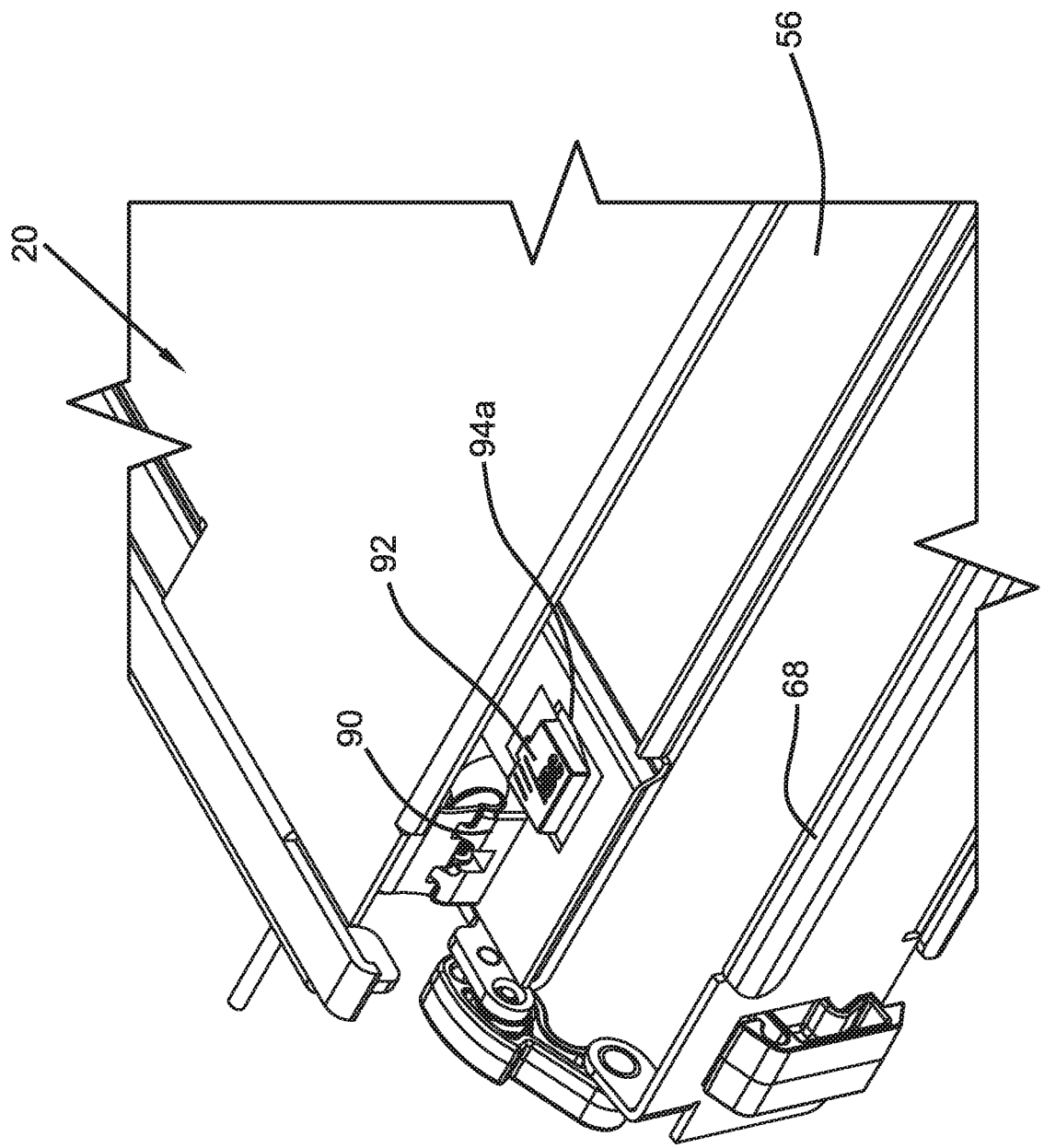
FIG. 5 is an enlarged view of a portion of FIG. 4.
Figure 6:
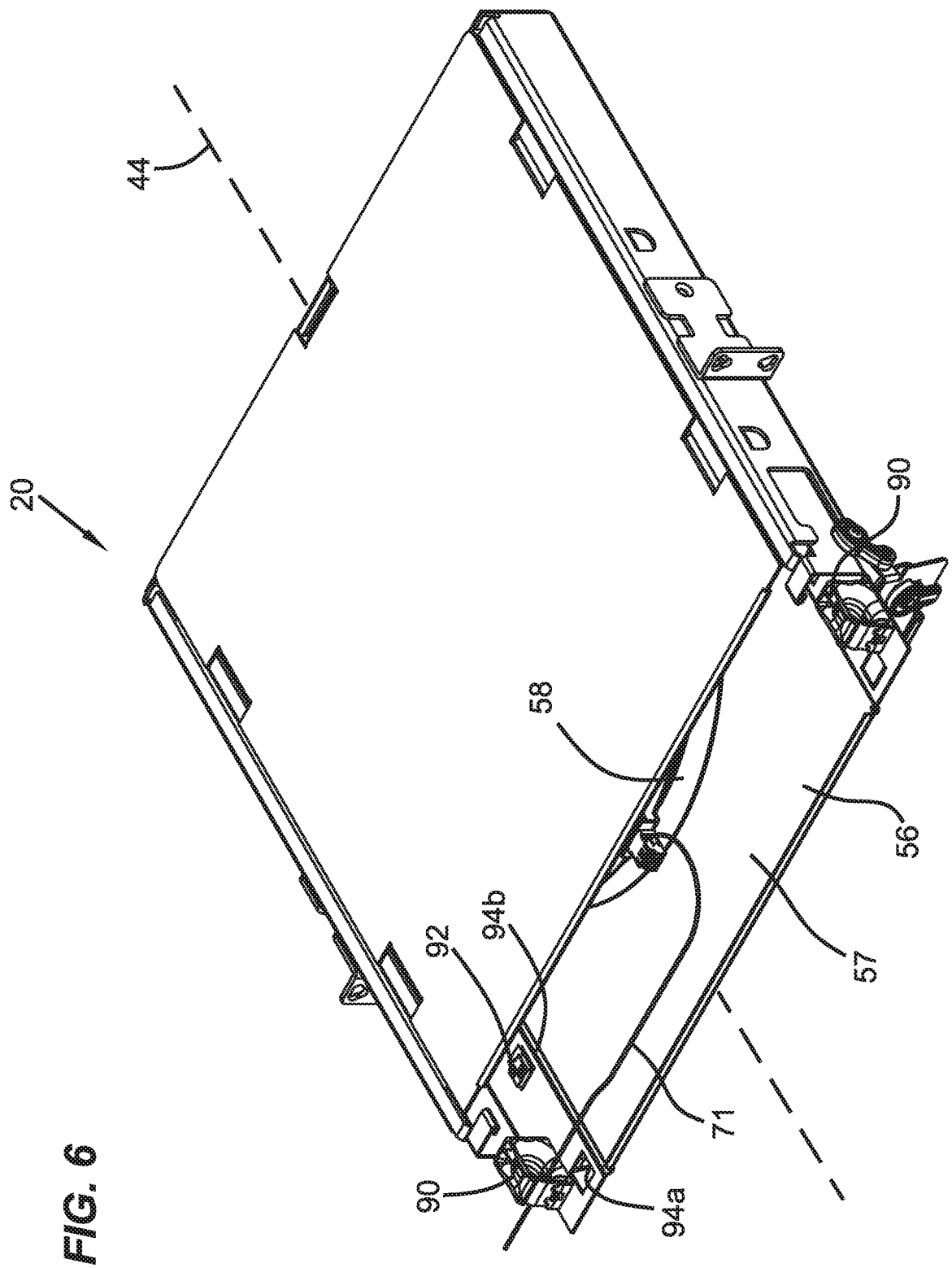
FIG. 6 is a perspective view of the telecommunication device of FIG. 1 with an inner tray moved to a cable payout position.
Figure 7:
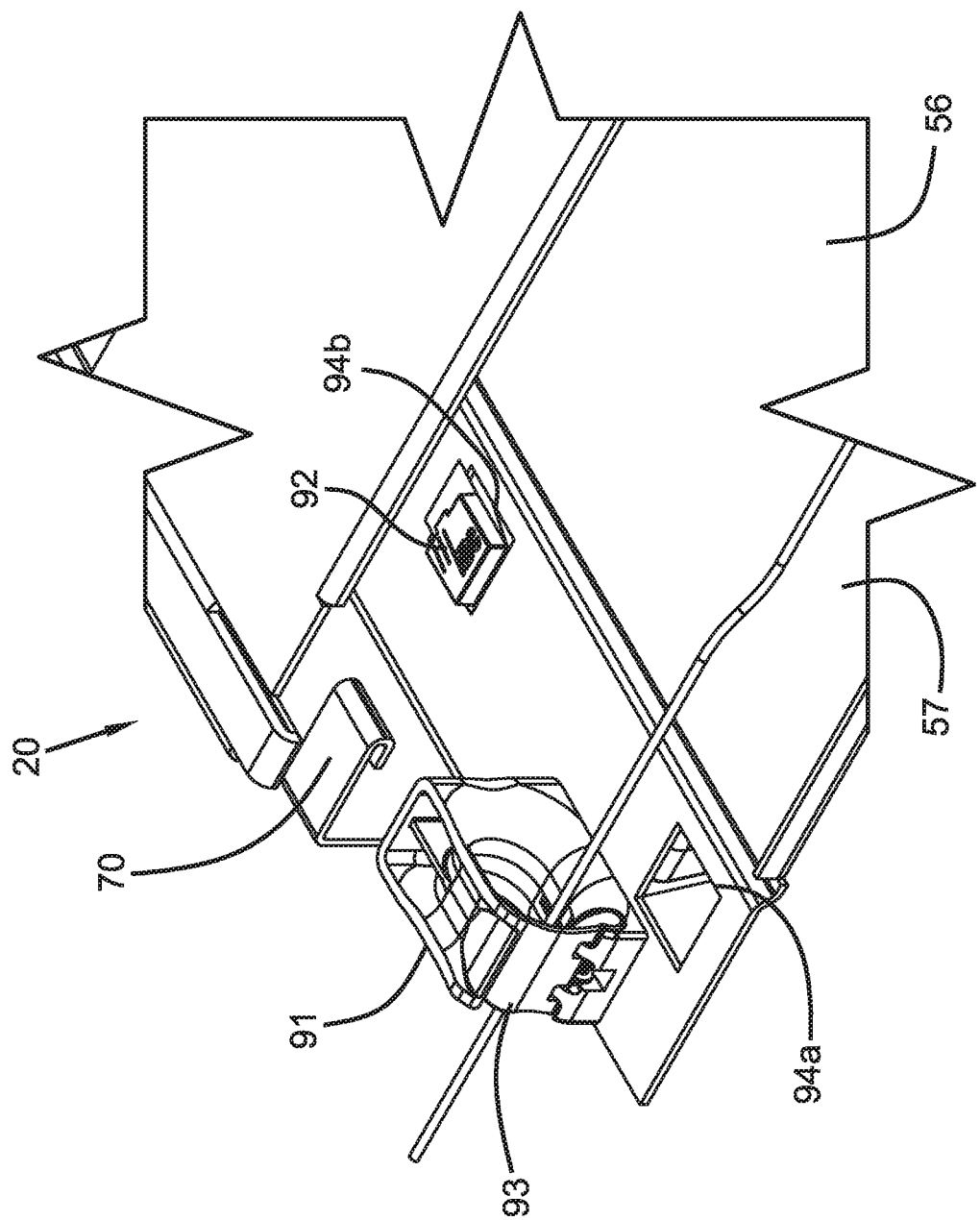
FIG. 7 is an enlarged view of a portion of FIG. 6.
Figure 8:
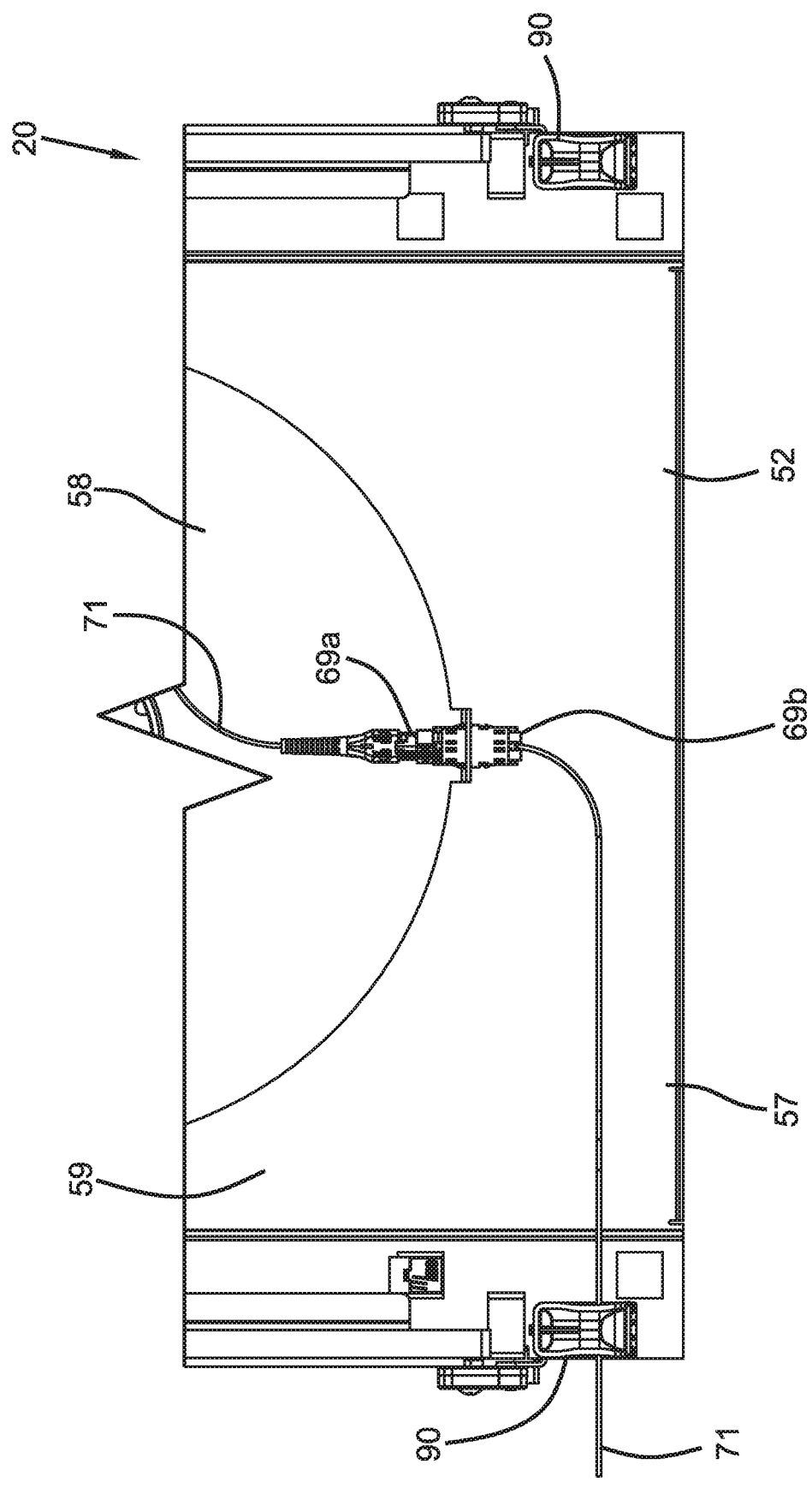
FIG. 8 is a top view of the telecommunication device of FIG. 6 with the top cover removed.
Figure 9:
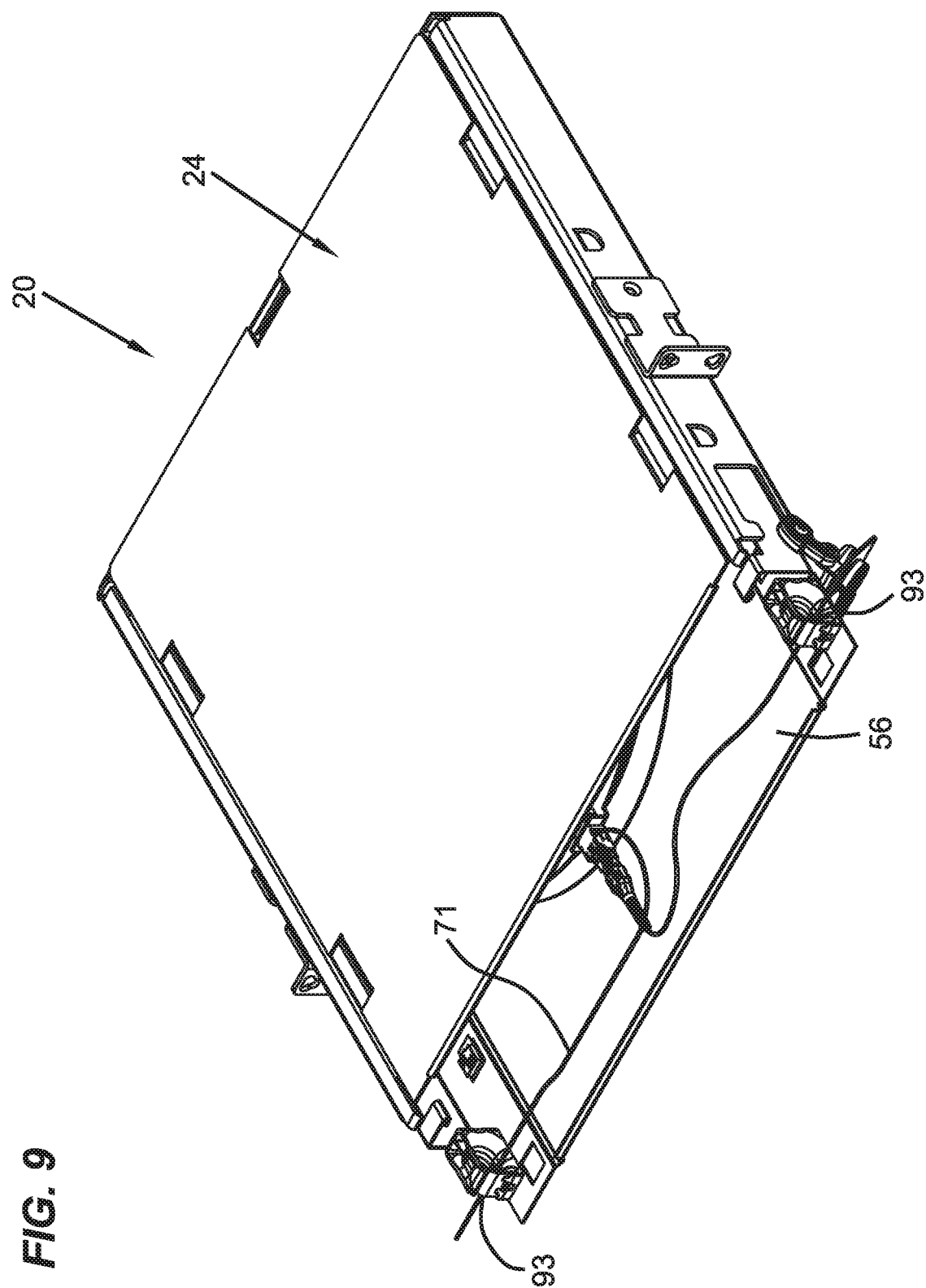
FIG. 9 depicts the telecommunication device of FIG. 6 with a jumper cable installed with respect to the telecommunication device.

In use of the telecommunication device 20, the front cover 60 is initially opened by unlocking the lock as shown at FIG. 3, and pivoting the front cover 68 to the open position as shown at FIGS. 4 and 5. The latch button 92 can then be depressed to allow the tray 56 to be moved from the first position to the second position as shown at FIGS. 6 and 7. With the tray 56 in the second position, the button latch snaps within the opening 94b of the tray 56. When the tray 56 is in the second position, the bend radius limiters 90 are positioned outside the interior of the enclosure 24, while when the tray 56 is in the first position, the bend radius limiters 90 are positioned inside the interior of the enclosure 24. With the tray in the second position, an operator can pull on the outer end of the cable spooled on the spool 58 to cause the cable to be paid out from the spool 58. It will be appreciated that because the tray 56 is in the second position, the spool 58 is not prevented from rotating by the stop 62. Once a sufficient length of cable 71 has been deployed from the spool 58, the cable can be routed through one of the bend radius limiters 90. Because the tray 56 is extended, the bend radius limiters 90 are readily accessible. Thereafter, one or more jumper cables 95 can be routed through the bend radius limiters 90 and plugged into the outer ports of the fiber optic adapters 66. In this way, connections can be made with other equipment. After the fiber routing has been completed, the push button 92 can be depressed and the tray 56 can be slid back from the second position to the first position. Preferably, the spool 50 is oriented such that the adapter 66 faces directly outwardly from the front of the enclosure 24 and the notch 64 faces rearwardly. As the tray 56 moves from the second position to the first position, stop 62 fits within the notch 64 to block rotation of the spool 58. When the tray 56 reaches the first position, the latching button 92 snaps within the opening 94a of the tray 56 as shown at FIG. 5. Thereafter, the front cover 68 can be pivoted from the open position of FIG. 4 back to the closed position of FIG. 3 and the latch can be engaged to hold the front cover 68 in the closed position. A wrench key can be used to lock the locking element of the front cover 68.

Aspects of the present disclosure relate to the ability to easily exchange a spool in the field or initially install a spool in the field. As previously indicated, this can be accomplished by either fully sliding the tray 56 out from the interior of the enclosure 24 as shown at FIG. 10, or by removing the top cover 42 to provide access to the top side of the tray 56 as shown at FIG. 2. To install a spool, the spool is inserted over the spool support core 80 as shown at FIG. 10. To remove a spool, the spool is lifted from the spool support core 80 as such at FIG. 11.

Figure 16:
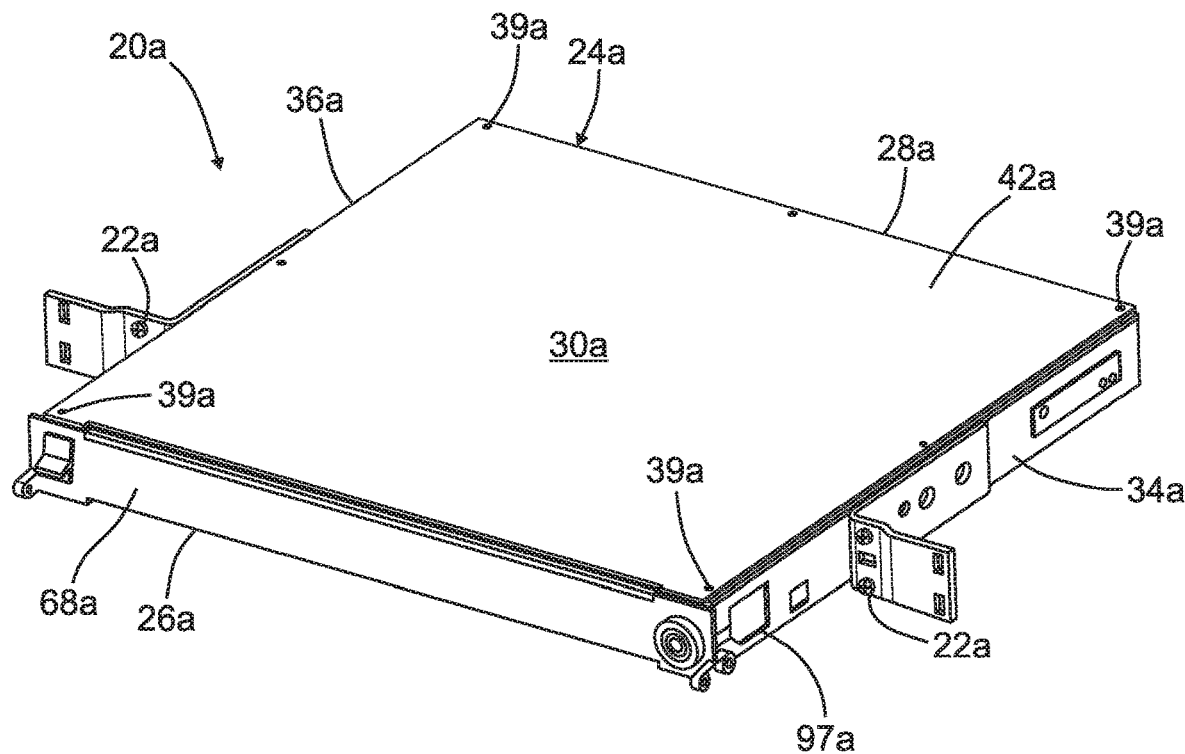
FIG. 16 is a perspective view of another telecommunication device in accordance with the principles of the present disclosure.
Figure 17:
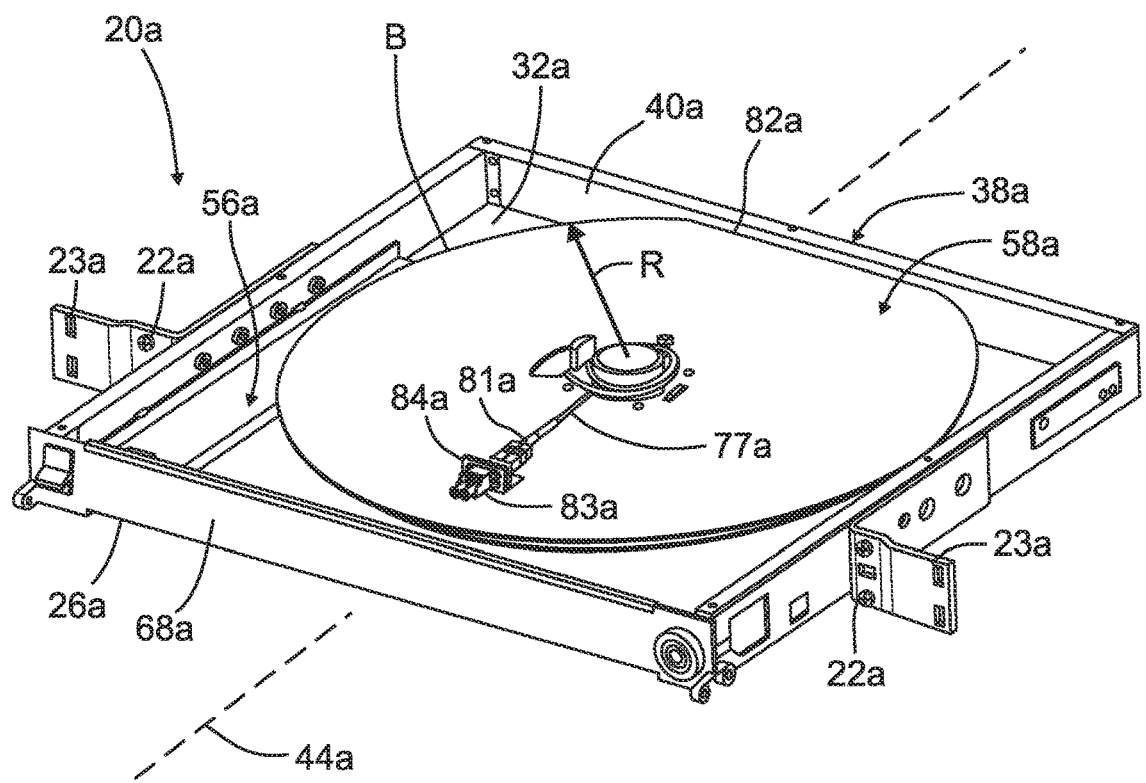
FIG. 17 depicts the telecommunication device of FIG. 16 with a top cover removed.

FIGS. 16 and 17 depict another telecommunication device 20a in accordance with the principles of the present disclosure. Similar to the telecommunication device 20, the telecommunication device 20a is adapted to be mounted to a conventional telecommunication rack in a horizontal configuration via brackets 22a (brackets 22a are shown used in combination with extenders 23a). Optionally the telecommunication device 20a is sized to occupy only one rack unit.

The telecommunication device 20a includes an enclosure 24a adapted to be mounted to a telecommunication rack by the rack mounting brackets 22a. The enclosure 24a includes a front end 26a, a rear end 28a, a major top side 30a, a major bottom side 32a, a minor left side 34a and a minor right side 36a. When the telecommunication device 20a is mounted to a rack, the major top and bottom sides 30a, 32a are horizontally oriented with the major top side 30a being above the major bottom side 32a. The enclosure 24a of the telecommunication device 20a includes a main housing body 38a including a bottom wall defining the major bottom side 32a of the enclosure 24a, left and right walls respectively defining the left and right minor sides 34a, 36a of the enclosure 24a, and a rear wall 40a defining the rear end 28a of the enclosure 24a. The enclosure also includes a top cover 42a that defines the major top side 30a of the enclosure 24a. The top cover 42a is mountable to the main housing body 38a to define the major top side 30a of the enclosure 24a. The top cover 42a is removable (as shown at FIG. 17) from the main housing body 38a to open the major top side 30a of the enclosure 24a, and attaches to the main housing body 38a by fasteners 39a such as bolts or screws which thread into internally threaded openings defined at top sides of the side walls and the rear end wall. A lockable front cover 68a can be used to selectively open and close the front end 26a. The front cover 68a can be pivotally mounted to the main body of the enclosure 24a in the same manner described with respect to the front cover 68. Thus, the front cover 68 is pivotally moveable between open and closed positions relative to the main body of the enclosure 24a.

Figure 21:
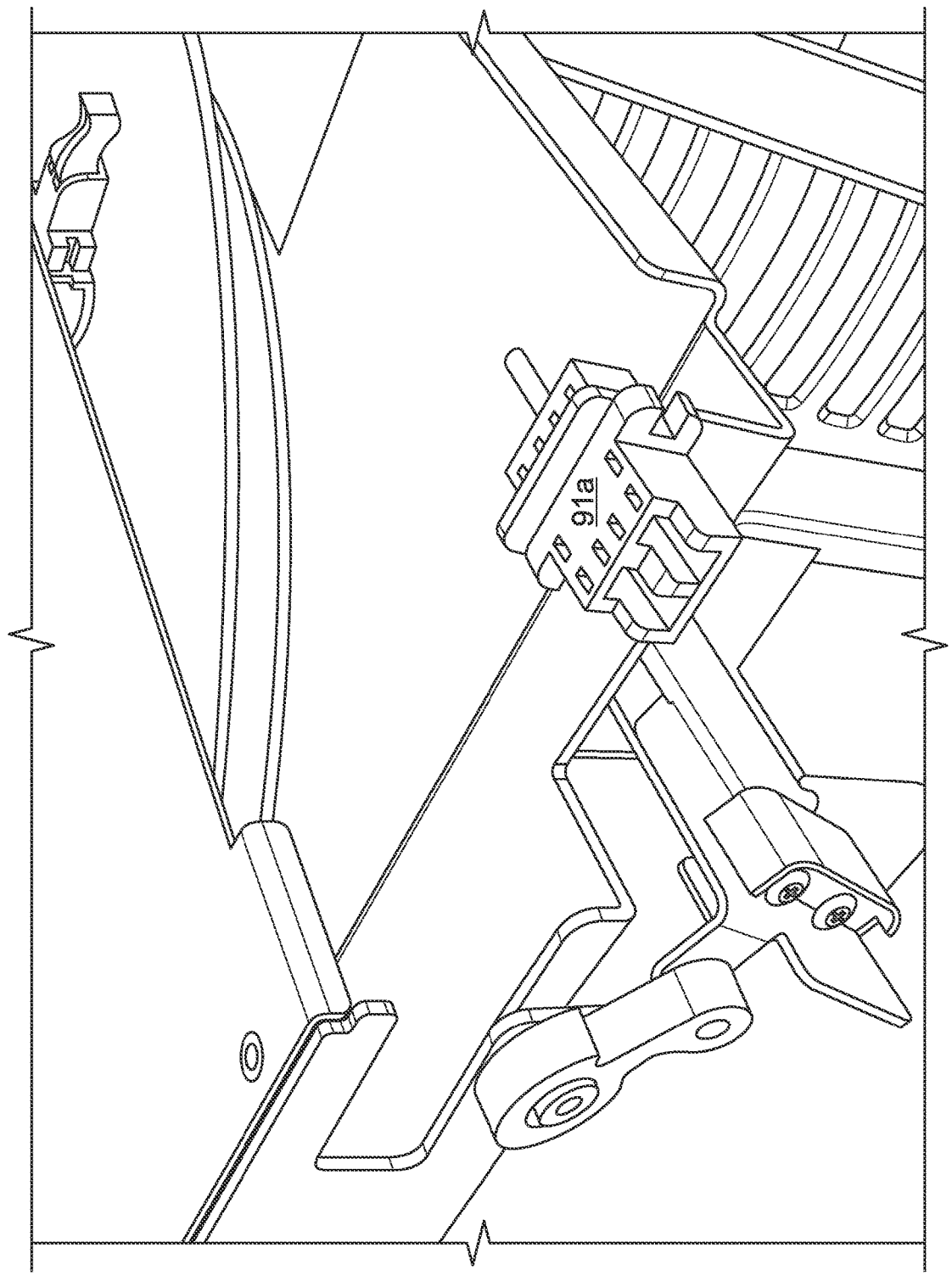
FIG. 21 depicts the front corner of the telecommunication device of FIGS. 16 and 17 with the front of the telecommunication device open and with the tray assembly in an extended position.
Figure 22:
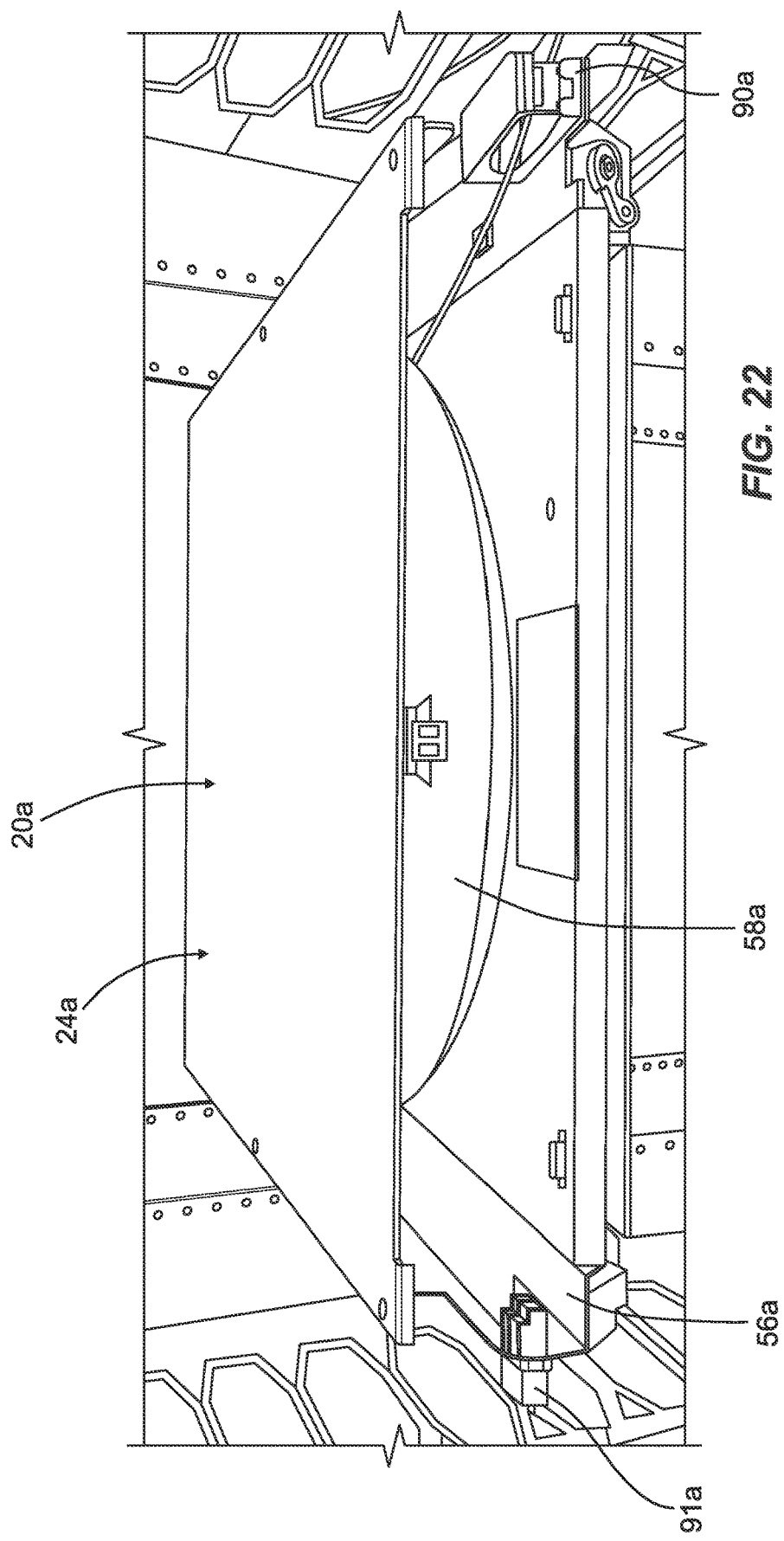
FIG. 22 depicts the telecommunication device of FIGS. 16 and 17 with the front open and with the tray assembly extended.

The telecommunication device 20a also includes a tray 56a that mounts within the enclosure 24a. The tray 56a is slidably movable relative to the enclosure 24a along a central front-to-rear axis 44a between a first position (e.g., a fully enclosed position, see FIGS. 17 and 20) and a second position (e.g., a partially enclosed position, see FIGS. 21 and 22). The tray 56a is fully within the enclosure 24a when in the first position. In contrast, when the tray 56a is in the second position, a forward portion of the tray 56a projects forwardly from the front end 26a of the enclosure 24a and a rearward portion is within the enclosure 24a. Latching features such as buttons, spring-loaded retainers or other structures (e.g., button latches as described with respect to the enclosure 24) can be used to retain the tray in the first and second positions. The tray 56a can also be fully removed from the enclosure 24a through the front end of the enclosure 24a when the front cover 68a is in the open position.

The telecommunication device 20a further includes a spool 58a that mounts on the tray 56a. The spool 58a is rotatable relative to the tray and the enclosure 24a about an axis of rotation 60a at least when the tray 56a is in the second position. In the depicted example, the axis of rotation 60a is vertically oriented and is generally perpendicular relative to the major top and bottom sides 30a, 32a of the enclosure 24a. The spool 58a includes a top spool flange 61a and a bottom spool flange 63a between which a cable storage region is defined in which a fiber optic cable 65a can be spooled. The spool includes a hub 67a that connects the flanges 61a, 63a together. The hub 67a can include a circumferential cable support surface about which the cable 65a is coiled. The circumferential cable support surface can include a first portion positioned between the flanges 61a, 63a and a second portion 75a that projects above the top flange 61a. The hub 67a can include hub flanges that are fastened to the spool flanges 61a, 63a by fasteners 69a such as screws or bolts. The hub 67a can also include a cable guide (e.g., a bend radius limiter 71a that projects upwardly through a cable opening 73a defined through the top spool flange 61a. The top spool flange 61a can also include cable tie locations 79a adjacent to the second portion 75a of the circumferential cable support surface. The fiber optic cable 65a is spooled about the first portion of the circumferential cable support surface. A first end section 77a of the cable 65a is routed from the first portion of the cable support surface through the cable opening 73a to the top side of the top spool flange 61a. The first end section 77a can originate at an inner diameter of the coil of cable 65a. The first end section 77a is routed around the second portion 75a of the cable support surface and can be tied to one of the cable tie-down location 79a. The first end section 77a can have a connectorized end 81a that plugs into a fiber optic adapter 83a mounted at an adapter mounting location such as an adapter mounting flange 84a that projects upwardly from the top spool flange 61a. In one example, the connectorized end 81a includes two LC connectors and the fiber optic adapter 83a includes a duplex LC fiber optic adapter. The connectorized end 81a plugs into inwardly facing adapter ports of the fiber optic adapter 83a that face in an inward radial direction toward the axis of rotation 60a. The fiber optic adapter 83a also includes outwardly facing ports that face in an outward radial direction away from the axis or rotation 60a.

A spool core 80a is mounted on the tray 56a and the spool 58a rotatably mounts on the spool core 80a. The spool hub 67a can define a central opening that receives the spool core 80a. The spool hub 76a and the spool core 80a can respectively define opposing rotational bearing surfaces. The spool 58a can be installed on and removed from the tray 56a in the same manner described with respect to the spool 58.

The spool 56a interfaces with a stop coupled to the enclosure 24a to prevent rotation of the spool 58a relative to the enclosure 24a and the tray 56a when the tray 56a is in the first position. The anti-rotation interface between the spool 58a and the stop 62a is automatically disengaged as the tray 56a is moved from the first position to the second position. In the depicted example of FIG. 17, the stop is defined by the rear wall 40a of the enclosure, and the spool 56a has an outer circumferential surface includes a flat 82a that opposes the rear wall in an interfering relationship when the tray 58a is in the first position such that interference between the rear wall 40a and the flat 82a prevents the spool 56a from rotating relative to the enclosure 24a. In one example, the flat 82a and the rear wall are parallel to one another and in relative close proximity to one another when the tray is moved to the first position while the spool is positioned with the flat 82a facing in a rearward direction. The flat 82a can be defined by at least one or both of the spool flanges 61a, 63a. The adapter mounting location for the adapter 83a is positioned at a diametrically opposite position on the spool from the flat 82a. In other examples, discontinuities other than a flat can be provided on the exterior > FIG. 17 shows the tray 56a in the first position (e.g., the fully enclosed position) where the rear wall 40a opposes the flat 82a and interferes with rotation of the spool 58. When the tray 58 is in the first position, the distance between the axis of rotation 60a and the rear wall 40a is less that a radius R of the spool 58a that extends from the axis of rotation 60a and a circular outer boundary B of the spool 58a. When tray 56a is in the second position (e.g., the partially enclosed position and also the cable payout position) the spool 58a is offset from the rear wall 40a by a distance large enough to prevent interference between the spool 58a and the rear wall 40a such that the rear wall does not prevent rotation of the spool 58a about the axis of rotation 60a. To lock rotation of the spool 58a, while the tray 56a is in the second position, the spool 58a is rotated on the tray 56a to a position where the flat 82a faces rearwardly. Then, the tray 56a is moved to the first position to bring the flat 82a into close opposing relation with respect to the rear wall 40a.

Figure 18:
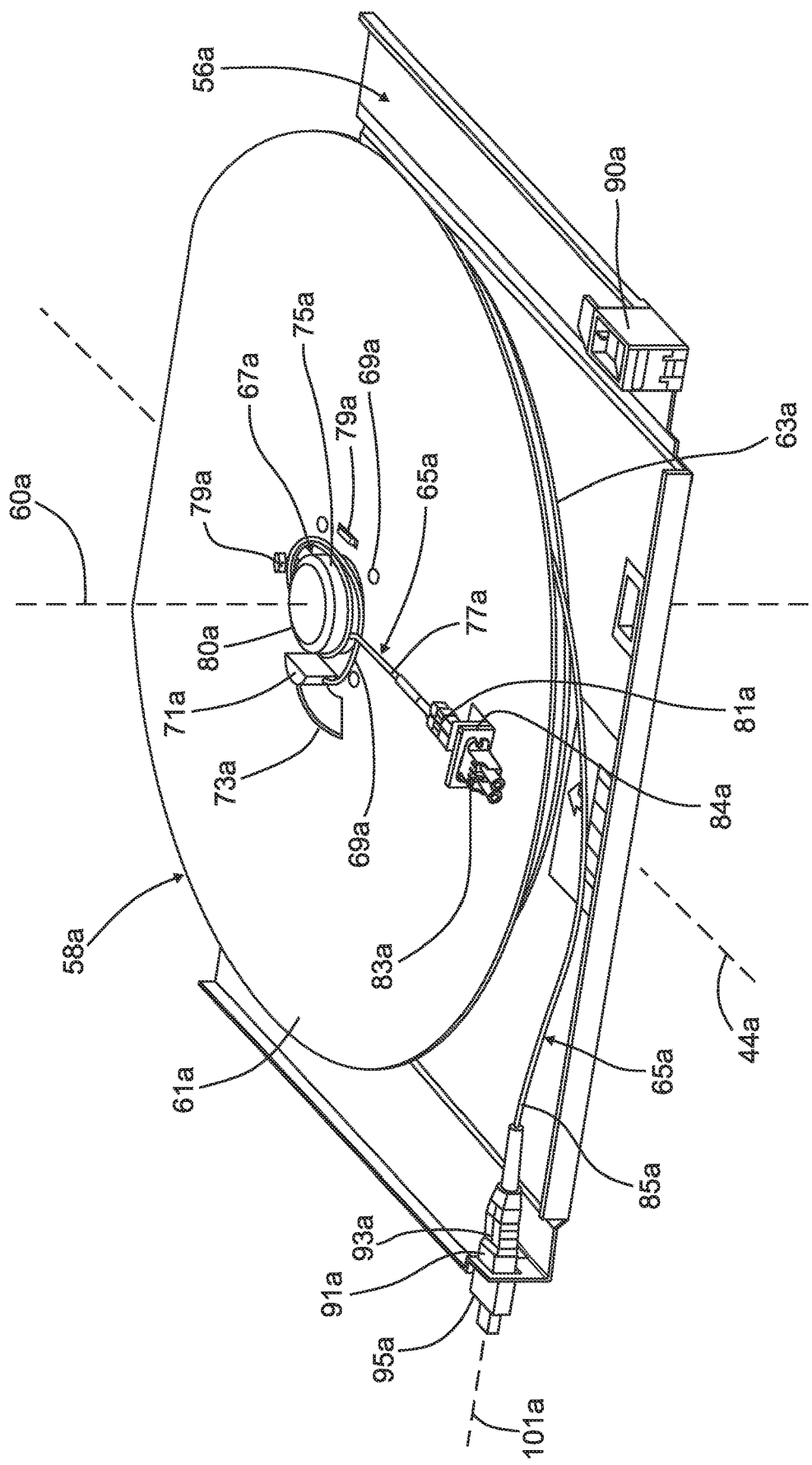
FIG. 18 depicts a tray assembly of the telecommunication device of FIGS. 16 and 17.
Figure 19:
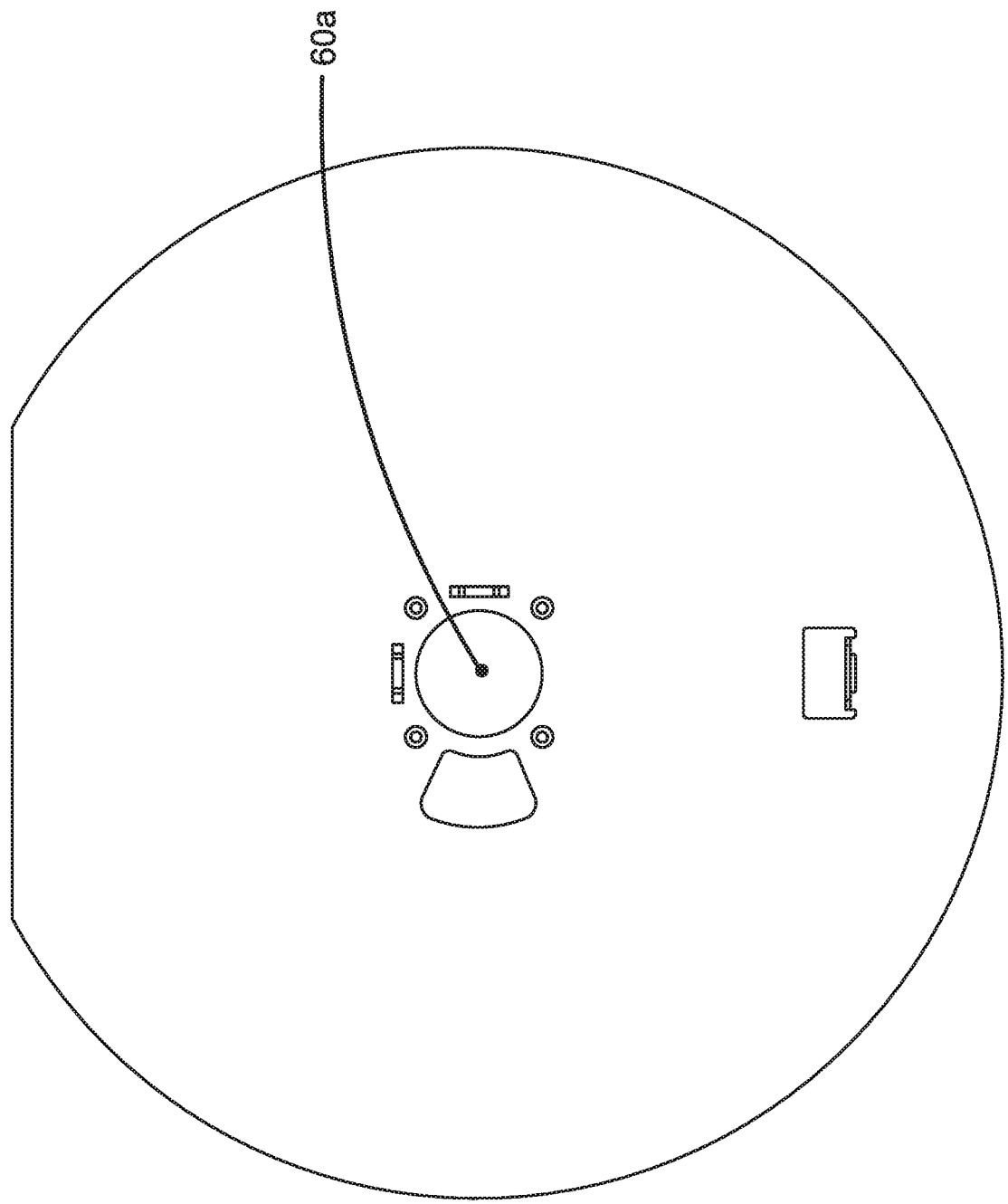
FIG. 19 is a plan of a top spool flange of a spool of the tray assembly of FIG. 18.

A second end section 85a (e.g., an end section originating at an outer diameter of the spool of cable 65a, see FIG. 18) of the fiber optic cable 65a can be paid out from the spool 58a through the front of the telecommunication device 20 when the tray 56a is in the second position. The fiber optic cable 65a is prevented from being paid out from the spool 58a through the front of the telecommunication device 20 when the tray is in the first position. The second end section 85a can be connectorized with one or more fiber optic connectors such as two LC fiber optic connectors.

Figure 20:
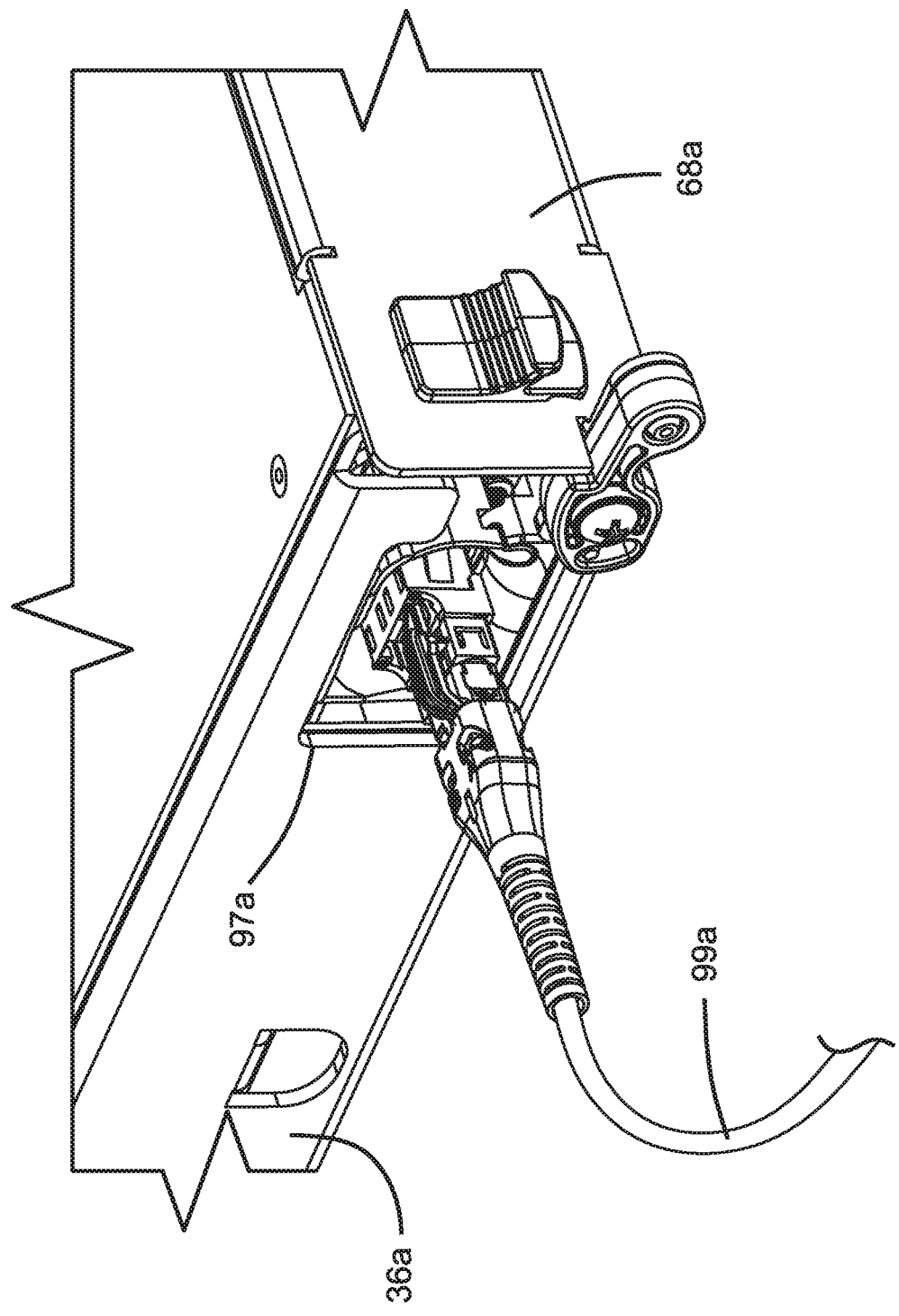
FIG. 20 depicts a front corner of the telecommunication device of FIGS. 16 and 17 with the telecommunication device in a closed configuration and with a customer cable plugged into a side port of the device.

In certain examples, the telecommunication device 20a includes a cable management feature 90a (e.g., a bend radius limiter, cable guide ring, etc.) mounted at one of the left and right sides of the tray 56a and a fiber optic adapter 91a mounted at the other of the left and right sides of the tray 56a. The fiber optic adapter 91a and the cable management feature 90a can be mounted at the front portion of the tray 56a and can be mounted on or adjacent to side walls of the tray. For example, the fiber optic adapter 91a is mounted in an adapter mounting openings defined by a side wall of the tray 56a and the cable management feature 90a is mounted at notch defined at a front end of a side wall of the tray 56a. The adapter 91a includes inner ports 93a that face toward the central axis 44a and outer ports 95a that face away from the central axis 44a. The side walls 34a, 36a of the main body 38a of the enclosure define side openings 97a (e.g., windows) adjacent the front of the main body. The fiber optic adapter 91a and the cable management feature 90a align with the side openings 97a and are positioned inwardly with respect to the side openings 97a. The side openings 97a have open front ends for allowing cables routed through the cable management feature 90 or coupled to the outer ports 95a to pass through when the tray 56a is moved from the first position to the second position. As shown at FIG. 20, a connectorized end of a customer cable 99a can be plugged into the outer port(s) 95a of the fiber optic adapter 91a through the side opening 97a when the tray 56a is in the first positon and the front of the enclosure 22a is closed. An axis 101a of the fiber optic adapter 91a is perpendicular with respect to the slide axis 44a of the tray 56a.

As shown at FIG. 18, the second end section 85a of the fiber optic cable 65a can plug into the inner port(s) 93a of the fiber optic adapter 91a. In use, a provider cable (e.g., from a data center) can be routed through the cable management feature 90a and plugged into the outwardly facing port(s) of the fiber optic adapter 83a and the customer cable 99a can be plugged into the outer port(s) 95a of the fiber optic adapter 91a. In this way, the data center can be optically coupled to the customer location. In certain examples, the extra cable length provided on the spool 58a can be used to establish a specific length of fiber provided between the data center and the customer location. For example, to establish the specific cable length, the length of cable stored on the spool 58 can be shortened a desired amount by paying out a length of cable from the spool corresponding to the second end section 85a, by cutting off a desired length of cable, and then by re-connectorizing the second end section 85a (e.g., by direct connectorization or by splicing on a connectorized fiber optic pigtail). The re-connectorized end is then plugged into the into the inner port(s) 93a of the fiber optic adapter 91a and the device is ready for connection to a customer cable.

What is claimed is:

1. A telecommunication device comprising:
an enclosure configured to be mounted to a telecommunication rack, the enclosure including a front end, a rear end, a major top side, a major bottom side, a minor left side and a minor right side;
the enclosure including a main housing body including a bottom wall defining the major bottom side of the enclosure, left and right walls respectively defining the left and right sides of the enclosure, and a rear wall defining the rear end of the enclosure;
the enclosure including a top cover that defines the major top side of the enclosure, the top cover being mountable to the main housing body to define the major top side of the enclosure and being removable from the main housing body to open the major top side of the enclosure;
a tray that mounts within the enclosure, the tray being slidably movable relative to the enclosure along a front-to-rear axis between a first position and a second position, wherein the tray is fully within the enclosure when in the first position and wherein a forward portion of the tray projects forwardly from the front end of the enclosure and a rearward portion of the tray is within the enclosure when the tray is in the second position; and
a spool that mounts on the tray, the spool being rotatable relative to the tray and the enclosure when the tray is in the second position, wherein the spool interfaces with a stop coupled to the enclosure to prevent rotation of the spool relative to the enclosure and the tray when the tray is in the first position, and wherein the interface between the spool and the stop is automatically disengaged as the tray is moved from the first position to the second position.

2. The telecommunication device of claim 1, wherein a fiber optic cable is coiled on the spool, wherein the fiber optic cable can be paid out from the spool when the tray is in the second position and is prevented from being paid out from the spool when the tray is in the first position.

3. The telecommunication device of claim 1, wherein the spool includes a notch at an outer circumference of the spool that is adapted to receive the stop when the tray is moved to the first position.

4. The telecommunication device of claim 1, wherein the stop is a projection that projects upwardly from the major bottom side of the enclosure.

5. The telecommunication device of claim 1, wherein the top cover can be mounted and removed from the main housing body without the use of a tool.

6. The telecommunication device of claim 5, wherein the top cover engages the main housing body at a slidable interface.

7. The telecommunication device of claim 1, further comprising a spool support core carried within the tray, wherein the spool rotatably mounts on the spool support core and is configured to rotate relative to the spool support core about a central axis of rotation defined by the spool support core.

8. The telecommunication device of claim 7, wherein the spool is removable from the spool support core by lifting the spool off the spool support core.

9. The telecommunication device of claim 1, further comprising a fiber optic adapter carried by the spool.

10. The telecommunication device of claim 9, wherein the fiber optic adapter is mounted at an outer circumference of the spool and is positioned at an opposite side of an axis of rotation of the spool from a notch.

11. The telecommunication device of claim 9, wherein the fiber optic adapter is a duplex adapter.

12. The telecommunication device of claim 11, wherein the fiber optic adapter is an LC adapter.

13. The telecommunication device of claim 9, wherein an inner end of a cable coiled on the spool has a connectorized end that is inserted into the fiber optic adapter, wherein the cable is adapted to be paid out from the spool starting from an outer end of the cable and working toward the inner end of the cable, wherein the spool rotates relative to the tray and the enclosure as the cable is paid out from the spool, and wherein the fiber optic adapter rotates in concert with the spool as the cable is paid out from the spool.

14. The telecommunication device of claim 1, wherein the enclosure includes a front cover that mounts at the front end of the enclosure, the front cover being movable between an open position and a closed position.

15. The telecommunication device of claim 14, further comprising a lock for securing the front cover in the closed position.

16. The telecommunication device of claim 15, wherein the lock is configured to be locked and unlocked with a key.

17. The telecommunication device of claim 14, wherein the front cover is connected to the enclosure by a pivot link having one end pivotally connected to the front end of the enclosure and a second end pivotally connected to the front cover.

18. The telecommunication device of claim 1, further comprising fiber bend radius limiters mounted at left and right sides of the tray at the forward portion of the tray.

19. The telecommunication device of claim 18, wherein the fiber bend radius limiters are cable receiving rings for routing cables leftwardly and rightwardly from the enclosure.

20. The telecommunication device of claim 1, further comprising rack mounting brackets secured at the left and right sides of the enclosure.

21. The telecommunication device of claim 1, wherein the tray is fully removable from the enclosure through the front end of the enclosure.

22. The telecommunication device of claim 14, wherein when the front cover is in the closed position and the top cover is mounted on the main housing body, the front cover prevents the top cover from being removed from the main housing body.

23. The telecommunication device of claim 1, further comprising a spring latch arrangement for latching the tray in the first and second positions.

24. The telecommunication device of claim 23, wherein the spring latch arrangement includes a spring loaded button latch at the bottom side of the enclosure that fits within openings defined by the tray corresponding to the first and second positions.

25. A telecommunication device comprising:
an enclosure configured to be mounted to a telecommunication rack, the enclosure including a front end, a rear end, a major top side, a major bottom side, a minor left side and a minor right side;
a tray that mounts within the enclosure, the tray being slidably movable relative to the enclosure along a front-to-rear axis between a first position and a second position, wherein the tray is fully within the enclosure when in the first position and wherein a forward portion of the tray projects forwardly from the front end of the enclosure and a rearward portion of the tray is within the enclosure when the tray is in the second position;
a spool that mounts on the tray and that is moveable with the tray as the tray is moved between the first and second positions, the spool being rotatable relative to the tray and the enclosure to allow cable to be paid out from the spool at least when the tray is in the second position; and
a latch for latching the tray in the first and second positions.

26. The telecommunication device of claim 1, wherein the rear wall defines the stop, and wherein an interference portion of the spool interferes with the rear wall when the tray is in the first position to prevent rotation of the spool relative to the tray.

27. The telecommunication device of claim 26, wherein the interference portion of the spool includes a flat defined at an outer perimeter of the spool.

28. The telecommunication device of claim 26, wherein a spool-mounted fiber optic adapter is mounted at an outer circumference of the spool and is positioned at an opposite side of an axis of rotation of the spool from the interference portion of the spool.

29. The telecommunication device of claim 1, wherein a fiber optic cable is coiled on the spool, wherein the fiber optic cable can be paid out from the spool when the tray is in the second position and is prevented from being paid out from the spool when the tray is in the first position.

30. The telecommunication device of claim 29, wherein a non-payable end of the fiber optic cable is routed through an opening defined by a flange of the spool and is plugged into a spool-mounted fiber optic adapter which is mounted at a top side of the spool.

31. The telecommunication device of claim 30, wherein a payable end of the fiber optic cable is plugged into a first port of a tray-mounted fiber optic adapter mounted at one of a left or right side of the tray.

32. The telecommunication device of claim 31, wherein one of the left or right walls of the main housing body defines a side opening that aligns with a second port of the tray-mounted fiber optic adapter when the tray is in the first position, and wherein the tray-mounted fiber optic adapter is forwardly offset from the side opening when the tray is in the second position.

33. The telecommunication device of claim 32, wherein when the tray is in the first position, a connectorized cable can be plugged into the second port of the tray-mounted fiber optic adapter through the side opening.

34. The telecommunication device of claim 32, further comprising a cable management ring mounted at the other of the left and right sides of the tray, wherein the other of the left or right walls of the main housing body defines a side opening that aligns with the cable management ring when the tray is in the first position, and wherein the cable management ring is forwardly offset from the side opening when the tray is in the second position.

35. The telecommunication device of claim 34, wherein the side openings have open front sides.

36. The telecommunication device of claim 1, further comprising a spool-mounted fiber optic adapter mounted to the spool and a tray-mounted fiber optic adapter mounted to the tray and not mounted to the spool, the tray-mounted fiber optic adapter being mounted at the forward portion of the tray.

37. The telecommunication device of claim 36, wherein the tray-mounted fiber optic adapter has adapter ports aligned along an adapter axis that is perpendicular with respect to a slide axis of the tray along which the tray is slid between the first and second positions.

38. The telecommunication device of claim 37, wherein the tray-mounted fiber optic adapter is mounted at one of the left or right sides of the tray.

39. The telecommunication device of claim 38, wherein one of the left or right walls of the main housing body defines a side opening that aligns with the adapter axis of the tray-mounted fiber optic adapter when the tray is in the first position, and wherein the tray-mounted fiber optic adapter is forwardly offset from the side opening when the tray is in the second position.

40. The telecommunication device of claim 39, wherein when the tray is in the first position, a connectorized cable can be plugged into the tray-mounted fiber optic adapter through the side opening.

41. The telecommunication device of claim 39, further comprising a cable management ring mounted at the other of the left and right sides of the tray, wherein the other of the left or right walls of the main housing body defines a side opening that aligns with the cable management ring when the tray is in the first position, and wherein the cable management ring is forwardly offset from the side opening when the tray is in the second position.

* * * * *